US012663632B2

(12) United States Patent
Dantowitz

(10) Patent No.: US 12,663,632 B2
(45) Date of Patent: Jun. 23, 2026

(54) TELESCOPE ARRAY SYSTEM AND PROCESSING METHOD

(71) Applicant: Ronald F. Dantowitz, Chestnut Hill, MA (US)

(72) Inventor: Ronald F. Dantowitz, Chestnut Hill, MA (US)

(73) Assignee: Ronald F. Dantowitz, Chestnut Hill, MA (US)

( * ) Notice: Subject to any disclaimer, the term of this patent is extended or adjusted under 35 U.S.C. 154(b) by 1000 days.

(21) Appl. No.: 17/370,109

(22) Filed: Jul. 8, 2021

(65) Prior Publication Data

US 2022/0026700 A1 Jan. 27, 2022

Related U.S. Application Data

(60) Provisional application No. 63/049,297, filed on Jul. 8, 2020.

(51) Int. Cl.
*G02B 23/00* (2006.01)
*G02B 7/198* (2021.01)
*G02B 23/16* (2006.01)

(52) U.S. Cl.
CPC ............. *G02B 23/16* (2013.01); *G02B 7/198* (2013.01); *G02B 23/145* (2013.01)

(58) Field of Classification Search
CPC ...... G02B 23/00; G02B 23/14; G02B 23/145; G02B 23/16; G02B 23/165; G02B 7/00;
(Continued)

(56) References Cited

U.S. PATENT DOCUMENTS 4,159,576 A * 7/1979 Campbell ................ G01C 1/00 33/1 H
4,950,063 A * 8/1990 Pohle ..................... G02B 26/06 356/141.3
(Continued)

FOREIGN PATENT DOCUMENTS

DE 102006036769 B3 4/2008

OTHER PUBLICATIONS

ISR, "International Search Report", PCT/US2021/040784, Oct. 13, 2021.
(Continued)

*Primary Examiner* — Thong Q Nguyen
(74) *Attorney, Agent, or Firm* — Intrinsic Law Corp.

(57) ABSTRACT

A telescope apparatus includes a telescope array comprising a plurality of telescopes each having a telescope aperture configured to receive light from a respective field of view. A light sensor is associated with each telescope to receive and sample light therefrom and to output data based at least in part thereon. A telescope array positioning assembly includes a support and individually-adjustable telescope supports coupled thereto, each of the plurality of individually-adjustable telescope supports adjustably supporting a respective one of the plurality of telescopes in a respective positioning and being adjustable to change the respective positioning of the respective telescope. An array processor receives the data output by the plurality of light sensors and generates an image and/or data based at least in part thereon.

27 Claims, 30 Drawing Sheets

(58) Field of Classification Search
CPC ........ G02B 7/003; G02B 7/004; G02B 7/005; G02B 7/02; G02B 7/021; G02B 7/022; G02B 7/023; G02B 7/102; G02B 7/18; G02B 7/182; G02B 7/1821; G02B 7/1824; G02B 7/1827; G02B 7/183; G02B 7/198
USPC .................................................. 359/399–435
See application file for complete search history.

(56) References Cited

U.S. PATENT DOCUMENTS

| | | | | | |
|---|---|---|---|---|---|
| 5,093,563 | A | | 3/1992 | Small et al. | |
| 5,905,591 | A | * | 5/1999 | Duncan | G02B 23/16 359/399 |
| 7,194,146 | B2 | | 3/2007 | BenDaniel et al. | |
| 7,199,348 | B2 | | 4/2007 | Olsen et al. | |
| 7,631,839 | B1 | * | 12/2009 | Duncan | G02B 27/58 359/399 |
| 7,772,532 | B2 | | 8/2010 | Olsen et al. | |
| 8,498,055 | B2 | * | 7/2013 | Dopilka | G02B 27/0025 359/399 |
| 9,995,882 | B2 | * | 6/2018 | Eikenberry | G02B 6/06 |
| 2016/0334582 | A1 | | 11/2016 | Eikenberry et al. | |
| 2017/0285126 | A1 | | 10/2017 | Paxman | |

OTHER PUBLICATIONS

Abraham, R. et al., “Dragonfly”, Dunlap Institute for Astronomy & Astrophysics Instrumentation, 2016, pp. 1-2, Unversity of Toronto.
Extended European Search Report for EP Patent App. No. 21836754.8, dated Jul. 30, 2024.

* cited by examiner

1600

1602

Adjustably supporting each one of a plurality of telescopes with a respective individually adjustable telescope support that is adjustable to change the respective positioning of the one of the plurality of telescopes

1604

Configuring each of a plurality of sensors to receive and sample light from a respective one of the plurality of telescopes and to output data based at least in part thereon

1606

Receiving, by a telescope array processor, the data output by the plurality of sensors

1608

Generating, by the telescope array processor, an image based at least in part on the data output by the plurality of sensors

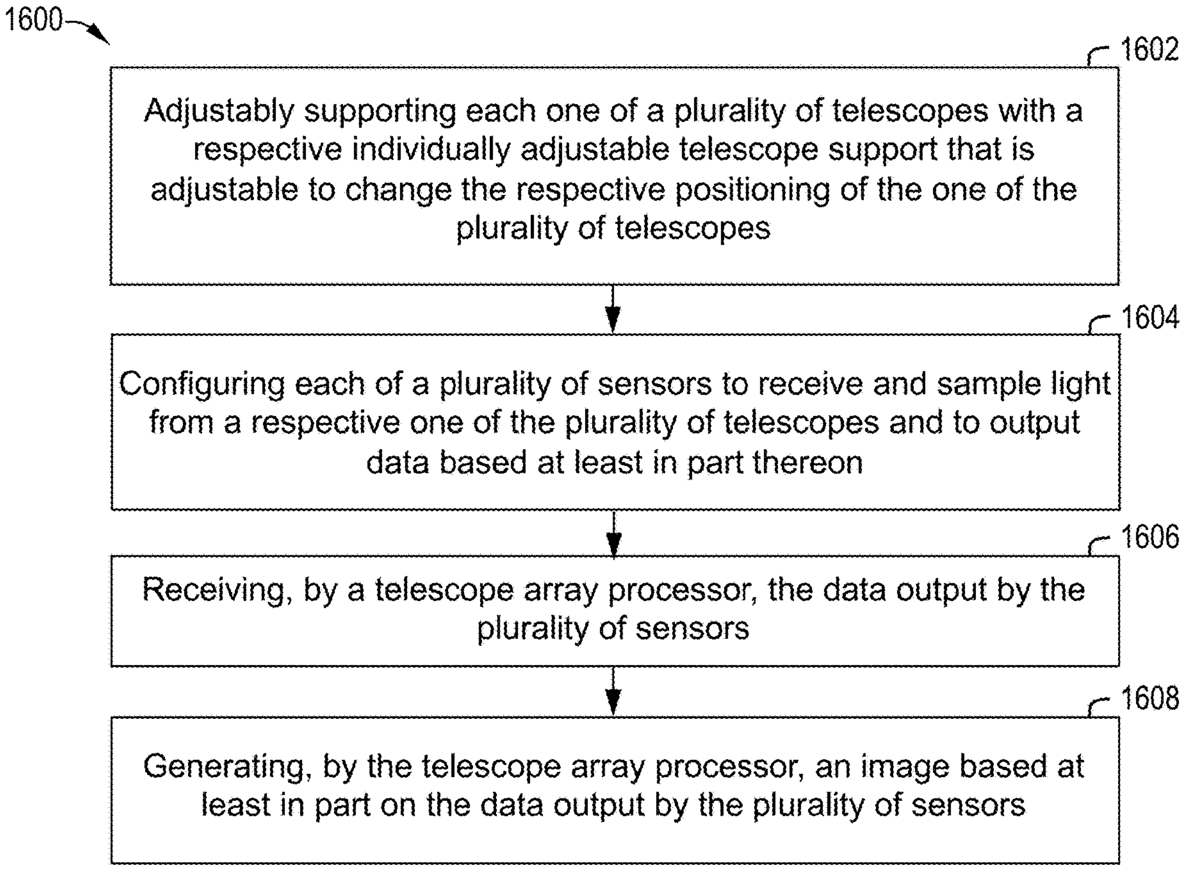

SENSE LIGHT WITH LIGHT SENSOR IN EACH TELESCOPE OF TELESCOPE ARRAY

1704

OUTPUT DATA SIGNAL FROM EACH LIGHT SENSOR TO ARRAY PROCESSOR

1706

GENERATE IMAGE USING DATA SIGNALS

TELESCOPE ARRAY SYSTEM AND PROCESSING METHOD

CROSS-REFERENCE TO RELATED APPLICATIONS

This application claims priority to U.S. Provisional Application No. 63/049,297, filed on Jul. 8, 2020, titled "Telescope Array System and Processing Method," which is hereby incorporated by reference.

TECHNICAL FIELD

This disclosure is directed to telescope systems and methods.

BACKGROUND

There are various types of optical telescope systems, all of which generally collect and distribute light passing through a telescope's aperture. Some telescope systems are designed to distribute the light flux producing a highly magnified narrow field of view at low intensity. Other telescope systems are optimized to deliver lower magnification, wider fields of view at high intensity. A given telescope system generally employs a fixed set of optical parameters, imposing limitations on the system's flexibility, efficiency, and suitability for detecting the signatures of objects and measuring the changes in those signatures, especially in the presence of a background signal.

SUMMARY

Space surveillance sensors are commonly single aperture, monolithic, fixed focal length optical systems designed or optimized for achieving specific types of observations. Such instruments may be optimized to detect brighter, fast-moving, closer objects over wide fields of view, or fainter, slow-moving, more distant objects over narrow fields of view, or at a fixed compromise somewhere in-between.

In at least some aspects, a telescope system includes a plurality of telescope apertures and allows for flexible configuration and/or reconfiguration of the plurality of telescope apertures.

According to one or more aspects, a telescope system comprises: a telescope array comprising a plurality of telescopes each having a telescope aperture configured to receive light from a respective field of view; a plurality of sensors each associated with a respective one of the plurality of telescopes to receive and sample light therefrom and to output data based at least in part thereon; a telescope array positioning assembly comprising a support and a plurality of individually-adjustable telescope supports coupled thereto, each of the plurality of individually-adjustable telescope supports adjustably supporting a respective one of the plurality of telescopes in a respective positioning and being adjustable to change the respective positioning of the respective telescope; and an array processor to receive the data output by the plurality of sensors and to generate an image and/or data based at least in part thereon.

In at least some embodiments, each of the plurality of individually-adjustable telescope supports is adjusted such that each of the plurality of telescopes are directed in a direction that is different, at least in part, from the direction of each, or some, of the others of the plurality of telescopes. But this is not limiting, and those skilled in the art will appreciate upon review of this disclosure that placement, positioning, pointing, and directional control can be flexibly applied by this system and method, including pointing all apertures to cover a wide area of sky, e.g., in an M×N configuration, or at a same point or area in the sky, e.g., in a 1×1 configuration, or somewhere in between. The different pointing configurations of the plurality of individually-adjustable telescopes are described as operating modes.

In at least some embodiments, the telescope array mode has a number of rows and a number of columns and wherein the plurality of individually-adjustable telescope supports are adjusted such that the fields of view of the plurality of telescopes are configured in an array having a number of rows that is different than the number of rows in the telescope array and/or a number of columns that is different than the number of columns in the telescope array.

In at least some embodiments, the telescope array has an M×N array configuration and wherein the plurality of individually-adjustable telescope supports are adjusted such that the fields of view of the plurality of telescopes of the telescope array have a configuration other than that of an M×N array.

In at least some embodiments, the plurality of individually-adjustable telescope supports are adjusted such that the fields of view of the plurality of telescopes of the telescope array have a 1×K array configuration, wherein M is not equal to 1, and wherein N is not equal to K.

In at least some embodiments, the array processor is further to receive an input signal indicative of an operating mode, and to generate the image and/or data based at least in part thereon.

In at least some embodiments, the array processor is further to receive an input signal indicative of an operating mode, and to control the plurality of actuators based at least in part on the input signal.

According to one or more aspects, a method comprises: adjustably supporting each of a plurality of telescopes with a respective individually-adjustable telescope support that can change the respective positioning of the respective telescope; configuring each of a plurality of sensors to receive and sample light from a respective one of the plurality of telescopes and to output data based at least in part thereon; receiving, by an array processor, the data output by the plurality of sensors; and generating, by the array processor, images or data based at least in part on the data output by the plurality of sensors.

According to one or more aspects, a method comprises: receiving, by an array processor, data output by a plurality of sensors each: (i) configured to receive and sample light from a respective one of a plurality of telescopes each one of which is supported by an individually-adjustable support that is designed to change the positioning of the one of the plurality of telescope supported thereby, and (ii) configured to output images or data based at least in part thereon; and generating, by the array processor, data or an image based at least in part on the data output by the plurality of sensors.

According to one or more aspects, at least one non-transitory computer readable storage medium stores processor-executable instructions that, when executed by at least one processor, results in the method.

In at least some embodiments, the ability to flexibly configure and/or reconfigure the plurality of telescope apertures enables observation of objects of different sizes, brightness, angular speeds, and/or colors.

In at least some embodiments, the ability to flexibly configure and/or reconfigure the plurality of telescope apertures makes it possible to provide a high sensitivity system (to observe objects that are small and/or faint) and to provide a fast search speed.

In at least some embodiments, the method and/or system may have sufficient sensitivity, flexibility, and/or near real time reporting ability to provide increased space domain awareness and safety of flight, enabling space operators to make informed, timely decisions regarding the protection and use of space assets.

This summary is intended to provide an overview of at least some of the subject matter of the present patent application. It is not intended to provide an exclusive or exhaustive explanation of the invention or embodiments thereof.

Thus, while certain aspects and embodiments have been presented and/or outlined in this Summary, it should be understood that the present aspects and embodiments are not limited to the aspects and embodiments in this Summary. Indeed, other aspects and embodiments, which may be similar to and/or different from, the aspects and embodiments presented in this Summary, will be apparent from the description, illustrations and/or claims, which follow.

Further limitations and disadvantages of conventional and traditional approaches will become apparent to one of skill in the art, through comparison of such systems with some aspects of the present invention as set forth in the remainder of the present application with reference to the drawings.

However, while various features and/or advantages are described in this summary and/or will become apparent in view of the following detailed description and accompanying drawings, it should be understood that such features and/or advantages are not required in all aspects and embodiments.

An aspect of the invention is directed to a telescope apparatus comprising: a telescope array comprising a plurality of telescopes each having a telescope aperture configured to receive light from a respective field of view; a plurality of light sensors each associated with a respective one of the plurality of telescopes to receive and sample light therefrom and to output data based at least in part thereon; a telescope array positioning assembly comprising a support and a plurality of individually-adjustable telescope supports coupled thereto, each of the plurality of individually-adjustable telescope supports adjustably supporting a respective one of the plurality of telescopes in a respective positioning and being adjustable to change the respective positioning of the respective telescope; and an array processor to receive the data output by the plurality of light sensors and to generate an image and/or data based at least in part thereon.

In one or more embodiments, each individually-adjustable telescope support comprises a frame and an adjustable clamp. In one or more embodiments, the frame of each individually-adjustable telescope support defines an opening to receive the respective telescope. In one or more embodiments, the adjustable clamp includes a first set of abutments that can adjust the respective positioning of the respective telescope with respect to a first axis and a second set of abutments that can adjust the respective positioning of the respective telescope with respect to a second axis that is orthogonal to the first axis. In one or more embodiments, the adjustable clamp further comprises a plurality of actuators, each actuator in mechanical communication with a respective abutment in the first set of abutments and in the second set of abutments.

In one or more embodiments, the actuators are in electrical communication with a controller, the controller generating actuator control signals to activate at least one of the actuators to adjust the respective positioning of the respective telescope. In one or more embodiments, the apparatus further comprises position sensors that are electrically coupled to the actuators and to the controller, the position sensors outputting position signals to the controller, the position signals of each position sensor representing a position of a respective actuator.

In one or more embodiments, the actuator control signals are configured to position the telescope array in a first operating mode. In one or more embodiments, in the first operating mode the telescopes are positioned so that the respective fields of view are arranged in an array and there is a partial overlap between neighboring fields of view, the array having a plurality of columns and rows. In one or more embodiments, the first operating mode has an expanded state where there is a minority of overlap between the neighboring fields of view. In one or more embodiments, in the first operating mode the telescopes are positioned so that the respective fields of view are arranged such that there is total overlap between the neighboring fields of view. In one or more embodiments, the array processor is configured to generate the image and/or data using a first operating mode input signal. In one or more embodiments, the actuator control signals are configured to position the telescope array in a second operating mode where the telescopes are positioned so that the respective fields of view are arranged in the array, the second operating mode having a compressed state where there is a majority of overlap between the neighboring fields of view. In one or more embodiments, the array processor is configured to generate the image and/or data using a second operating mode input signal.

In one or more embodiments, the actuator control signals are configured to position the telescope array in a third operating mode where the telescopes are positioned so that the respective fields of view are arranged in a single column or a single row and there is a minority of overlap between the neighboring fields of view. In one or more embodiments, the actuator control signals are configured to position the telescope array in a fourth operating mode where the telescopes are positioned so that the respective fields of view are laterally offset with respect to a central axis and there is a minority of overlap between the neighboring fields of view.

In one or more embodiments, each telescope is disposed in a housing. In one or more embodiments, the array processor is configured to scan pixels of an image captured by the light sensors to find clusters of adjacent pixels which lie in a same image row, and to merge any clusters that are adjacent to one another.

Another aspect of the invention is directed to a method for viewing celestial objects, comprising: sensing light, with a respective light sensor, received by each of a plurality of telescopes in a telescope array, each telescope having a respective telescope aperture configured to receive light from a respective field of view; outputting a data signal from the respective light sensor to an array processor, the data signal representing the light collected by the respective light sensor; and generating, by the array processor, an image and/or data using the data signals from the respective light sensors.

In one or more embodiments, the method further comprises adjustably In one or more embodiments, the method further comprises, with the array processor, merging at least some of the data signals based on a relative positioning of each telescope. In one or more embodiments, the method further comprises receiving, at a controller and the array processor, an operating mode input signal that represents an operating mode of the telescope array; and automatically generating control signals, with the controller, to adjust the respective individually-adjustable telescope supports to set the relative positioning of each telescope that corresponds to the operating mode.

In one or more embodiments, the control signals activate one or more actuators in the respective individually-adjustable telescope supports to set the relative positioning of each telescope that corresponds to the operating mode. In one or more embodiments, the operating mode input signal represents a first operating mode of the telescope array, and the respective individually-adjustable telescope supports are adjusted to set the relative positioning of each telescope so that the respective fields of view are arranged in an array and there is a minority of overlap between neighboring fields of view, the array having a plurality of columns and rows.

In one or more embodiments, the method further comprises receiving, at the controller and the array processor, a second operating mode input signal that represents a second operating mode of the telescope array; and automatically generating the control signals, with the controller, to adjust the respective individually-adjustable telescope supports to set the relative positioning of each telescope that corresponds to the second operating mode, wherein the relative positioning of each telescope is set so that the respective fields of view are arranged in an array and there is a majority of overlap between the neighboring fields of view.

In one or more embodiments, the method further comprises receiving, at the controller and the array processor, a third operating mode input signal that represents a third operating mode of the telescope array; and automatically generating the control signals, with the controller, to adjust the respective individually-adjustable telescope supports to set the relative positioning of each telescope that corresponds to the third operating mode, wherein the relative positioning of each telescope is set so that the respective fields of view are arranged in a single column or a single row and there is a partial overlap between the neighboring fields of view. In one or more embodiments, the method further comprises receiving, at the controller and the array processor, a fourth operating mode input signal that represents a fourth operating mode of the telescope array; and automatically generating the control signals, with the controller, to adjust the respective individually-adjustable telescope supports to set the relative positioning of each telescope that corresponds to the fourth operating mode, wherein the relative positioning of each telescope is set so that the respective fields of view are laterally offset with respect to a central axis and there is a minority of overlap between the neighboring fields of view.

BRIEF DESCRIPTION OF THE DRAWINGS

Reference is made to the following detailed description in connection with the accompanying drawings.

FIG. 16 is a flowchart of a method in accordance with some embodiments.

DETAILED DESCRIPTION

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Moreover, other objects, advantages and novel features will become apparent in view of the following detailed description and accompanying drawings. However, while various objects, features and/or advantages are described herein and/or will become apparent in view of the following detailed description and accompanying drawings, it should be understood that such, objects, features and/or advantages are not required in all aspects and embodiments.

At least some embodiments disclosed herein allows for flexible configuration and/or reconfiguration of a plurality of apertures.

Figure 1A:
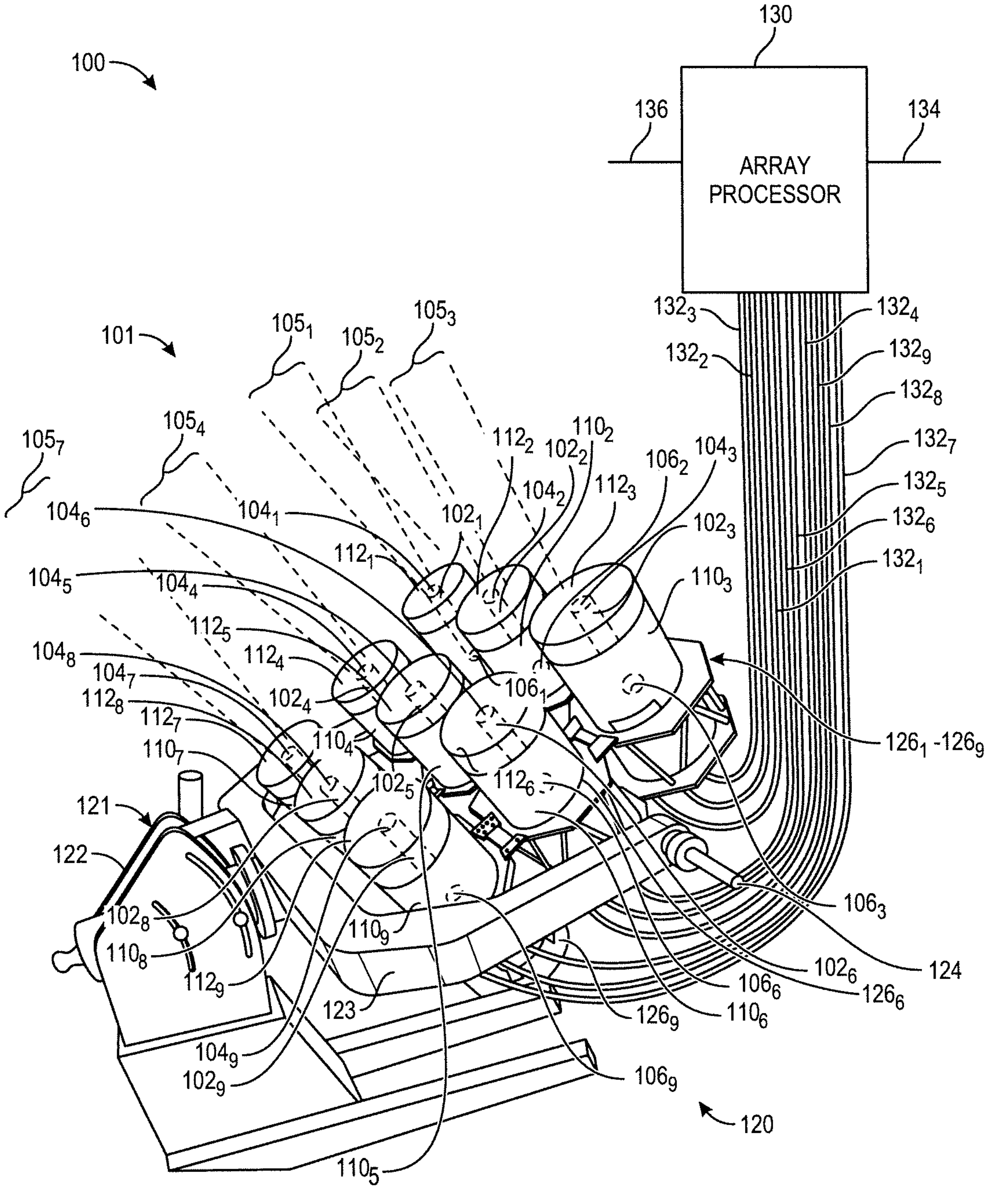
FIG. 1A, is a part perspective view, part schematic block diagram view of a system, in accordance with some embodiments.

FIG. 1A is a part perspective view, part schematic block diagram view of a system 100 that allows for flexible configuration and/or reconfiguration of a plurality of apertures, in accordance with some embodiments.

Figure 1B:
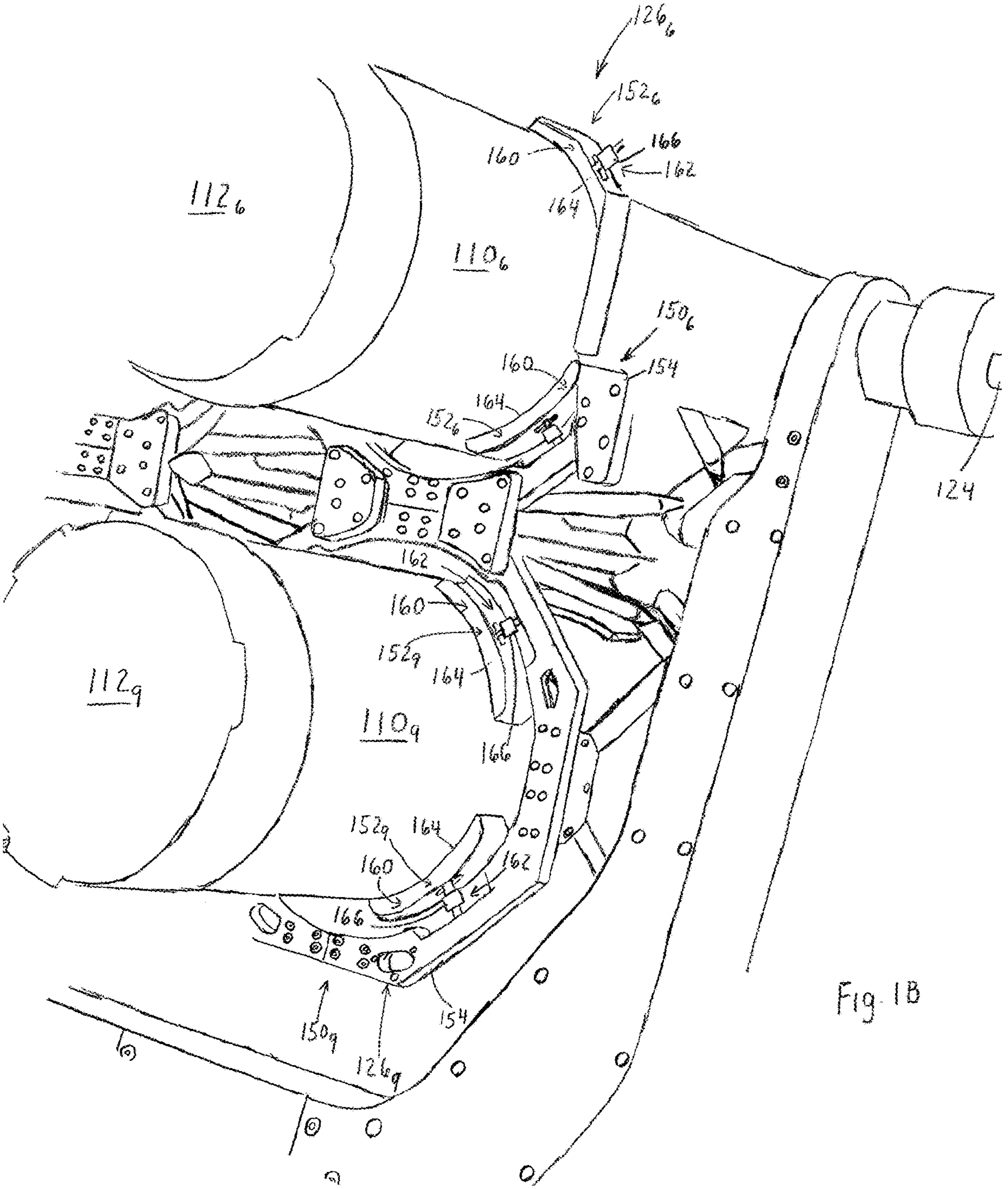
FIG. 1B is an enlarged perspective view of a portion of the system of FIG. 1A, in accordance with some embodiments.

FIG. 1B is an enlarged perspective view of a portion of the system of FIG. 1A, in accordance with some embodiments.

Referring to FIGS. 1A-1B, the system 100 includes a telescope array 101 comprising a plurality of telescopes (sometimes referred to herein as a telescope array or array), e.g., telescopes $\mathbf{102}_1$-$\mathbf{102}_9$ (in general, telescope(s) 102), each having a respective telescope aperture, e.g., a respective one of telescope apertures $\mathbf{104}_1$-$\mathbf{104}_9$ (in general, telescope aperture(s) 104), to receive light from a respective field of view $\mathbf{105}_1$-$\mathbf{105}_9$ (in general, field of view 105). For example, telescope $\mathbf{102}_1$ has a telescope aperture $\mathbf{104}_1$ to receive light from a field of view $\mathbf{105}_1$. Telescope $\mathbf{102}_2$ has a telescope aperture $\mathbf{104}_2$ to receive light from a field of view $\mathbf{105}_2$. Telescope $\mathbf{102}_3$ has a telescope aperture $\mathbf{104}_3$ to receive light from a field of view $\mathbf{105}_3$. And so on.

In at least some embodiments, the plurality of telescopes 102 are arranged in an array having one or more rows and one or more columns. In the illustrated embodiment, the plurality of telescopes 102 are arranged in an array having three rows (e.g., row 1: telescopes $\mathbf{102}_1$-$\mathbf{102}_3$, row 2: telescopes $\mathbf{102}_4$-$\mathbf{102}_6$, and row 3: telescopes $\mathbf{102}_7$-$\mathbf{102}_9$) and three columns (column 1: telescopes $\mathbf{102}_1$, $\mathbf{102}_4$, $\mathbf{102}_7$, column 2: telescopes $\mathbf{102}_2$, $\mathbf{102}_5$, $\mathbf{102}_8$ and column 3: telescopes $\mathbf{102}_3$, $\mathbf{102}_6$, $\mathbf{102}_9$).

However, the array may have any configuration. The illustrated array is symmetrical (or at least generally symmetrical) and uniformly (or at least generally uniformly) filled with uniform (or at least generally uniform) spacing, no overlap between rows and no overlap between columns. However, this is not a requirement. Thus, the array may or may not be symmetrical. It may have one or more empty locations (i.e., a location with no telescope) and/or non-uniform spacing between rows, between columns and/or between locations. There may be overlap between two or more rows and/or overlap between two or more columns. Moreover, in some embodiments, rows may or may not be parallel to one another, and columns may or may not be parallel to one another. The array may have telescopes and sensors of different sizes, types, and/or arrangement.

The field of view 105 of any given one of the plurality of telescopes 102 depends at least in part on the positioning of that telescope. In view thereof, the relative positioning of the fields of view 105 as a whole will depend at least in part on the relative positioning of the plurality of telescopes 102 as a whole. In at least some embodiments, the fields of view 105 are arranged in an array having one or more rows and one or more columns.

Figure 2A:
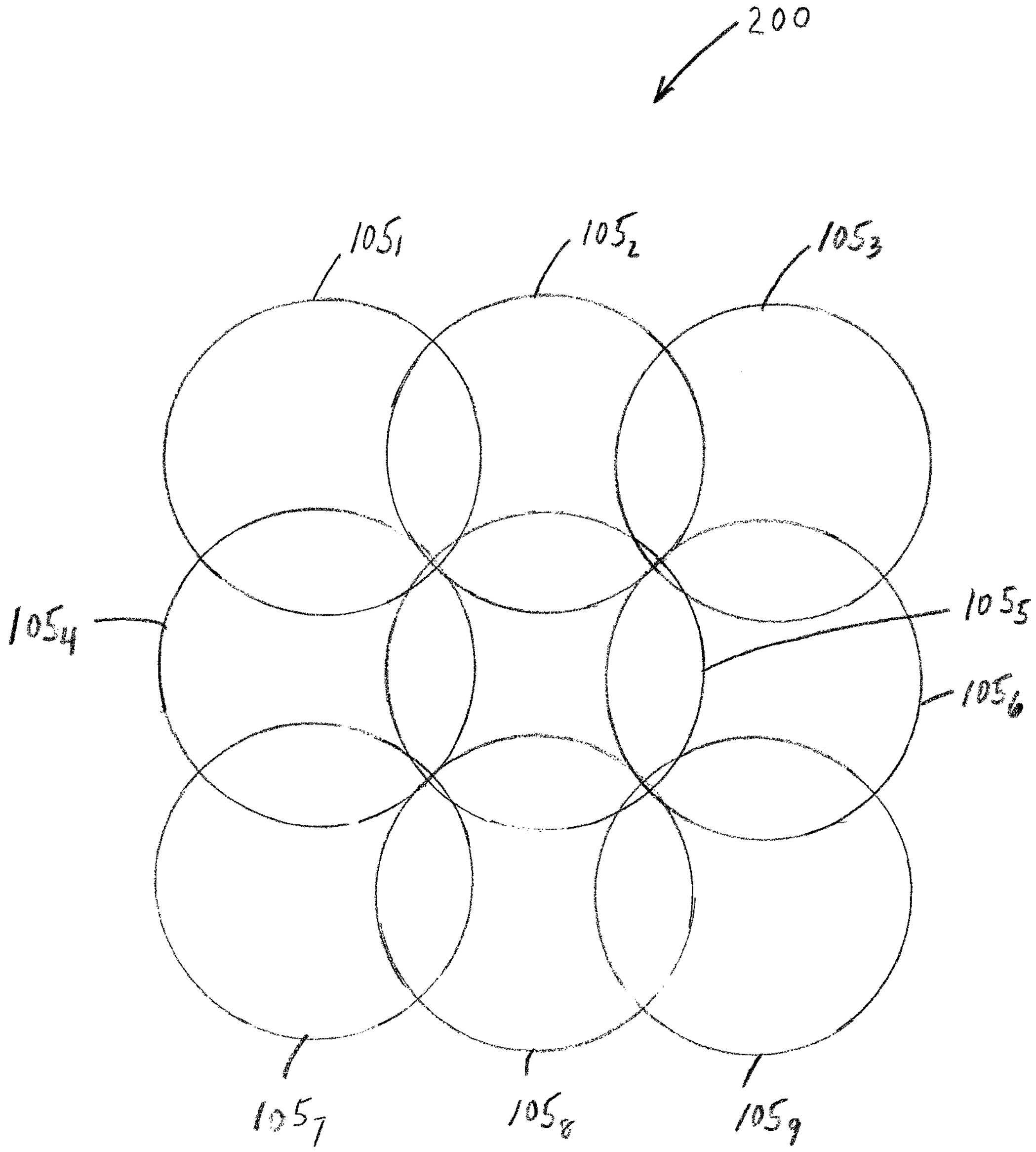
FIG. 2A is a schematic representation showing one possible relative positioning (operating mode) of a plurality of fields of view, in accordance with some embodiments.

FIG. 2A is schematic representation 200 of a cross section of the fields of view showing one possible relative positioning (sometimes referred to herein as a mode) of the fields of view 105, which is based at least in part on one possible relative positioning of the plurality of telescopes 102 in accordance with some embodiments.

In the illustrated embodiment, the plurality of fields of view $\mathbf{105}_1$-$\mathbf{105}_9$ are arranged in an array having three rows (e.g., row 1: fields of view $\mathbf{105}_1$-$\mathbf{105}_3$, row 2: fields of view $\mathbf{105}_4$-$\mathbf{105}_6$, and row 3: fields of view $\mathbf{105}_7$-$\mathbf{105}_9$) and three columns (column 1: fields of view $\mathbf{105}_1$, $\mathbf{105}_4$, $\mathbf{105}_7$, column 2: fields of view $\mathbf{105}_2$, $\mathbf{105}_5$, $\mathbf{105}_8$ and column 3: fields of view $\mathbf{105}_3$, $\mathbf{105}_6$, $\mathbf{105}_9$ However, in accordance with at least some embodiments, the array may have any configuration. The illustrated array is symmetrical (or at least generally symmetrical) and uniformly (or at least generally uniformly) filled with uniform (or at least generally uniform) offset between rows and between columns and uniform (or at least generally uniform) overlap between rows and between columns. For example, the fields of view 105, as illustrated in representation 200, are oriented in an M×M array where M equals 3. In other embodiments, M can be an any positive integer greater than 1 (e.g., 2, 3, 4, 5, etc.), any positive integer greater than 2 (e.g., 3, 4, 5, 6, etc.), any positive integer greater than 3 (e.g., 4, 5, 6, 7, etc.), and so on.

However, this is not a requirement (and in some embodiments, may not be desired). Thus, the array may or may not be symmetrical. For example, the fields of view can be oriented in an M×N array where M and N are positive integers and M does not equal N. Non-limiting examples of the M×N array include 1×N, 2×N, 3×N, 4×N, 5×N, and so on where N is an integer between 2 and 20 (or an integer greater than 20 in other embodiments), and N does not equal M.

In some embodiments, the array (M×M, M×N, or other array) may have one or more empty locations (i.e., a location with no field of view) and/or non-uniform spacing or offset between rows, between columns and/or between locations. There may or may not be overlap between two or more rows and/or overlap between two or more columns. Moreover, in some embodiments, rows may or may not be parallel to one another, and columns may or may not be parallel to one another.

As will be further discussed below, each possible configuration of the fields of view may represent or otherwise be associated with a different possible operating mode of the system 100.

In at least some embodiments, each operating mode may be associated with one or more objectives. One or more of the objectives of one operating mode may be different than one or more objectives of one or more other operating modes.

Figure 2B:
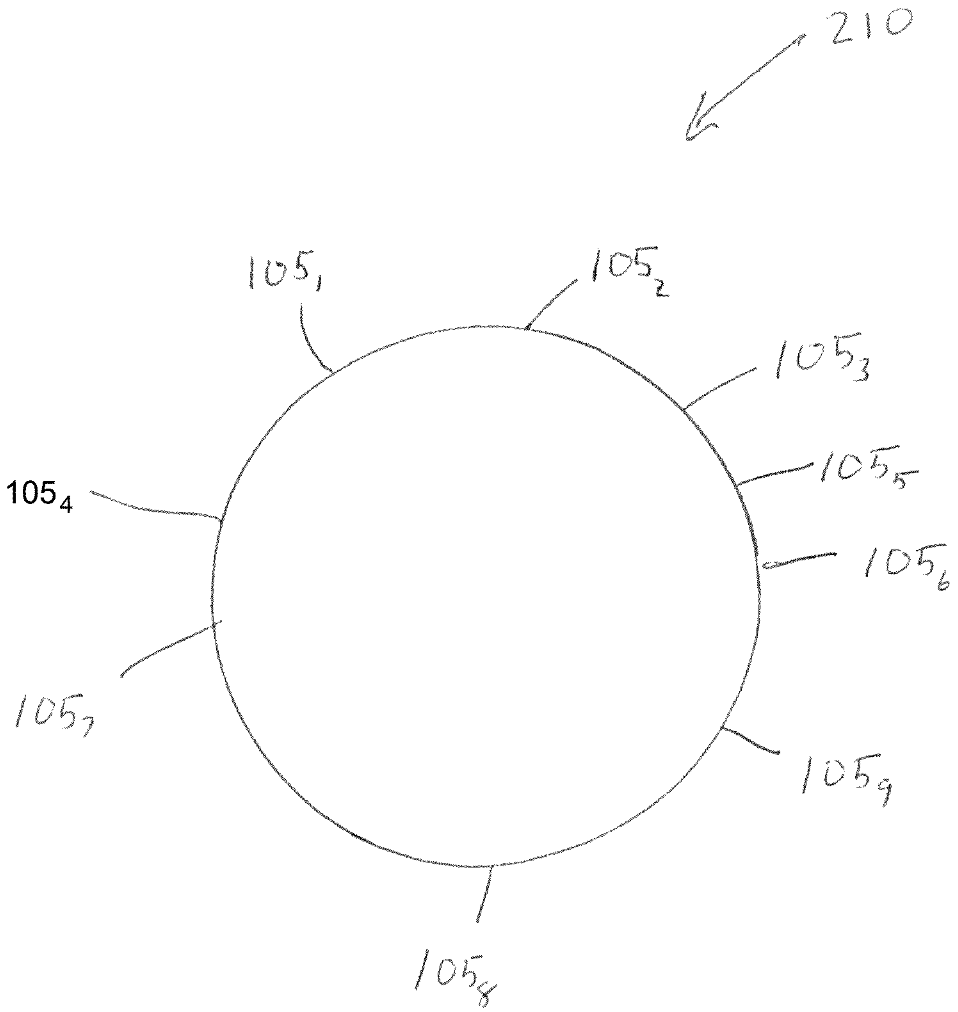
FIG. 2B is a schematic representation showing another possible relative positioning of a plurality of fields of view, in accordance with some embodiments.

FIG. 2B is a schematic representation 210 showing another possible positioning of the fields of view 105, e.g., fields of view $\mathbf{105}_1$-$\mathbf{105}_9$, of the plurality of telescopes 102, e.g., telescopes $\mathbf{102}_1$-$\mathbf{102}_9$, respectively, which is based at least in part on one possible relative positioning of the plurality of telescopes 102, e.g., telescopes $\mathbf{102}_1$-$\mathbf{102}_9$, in accordance with some embodiments.

Figure 2C:
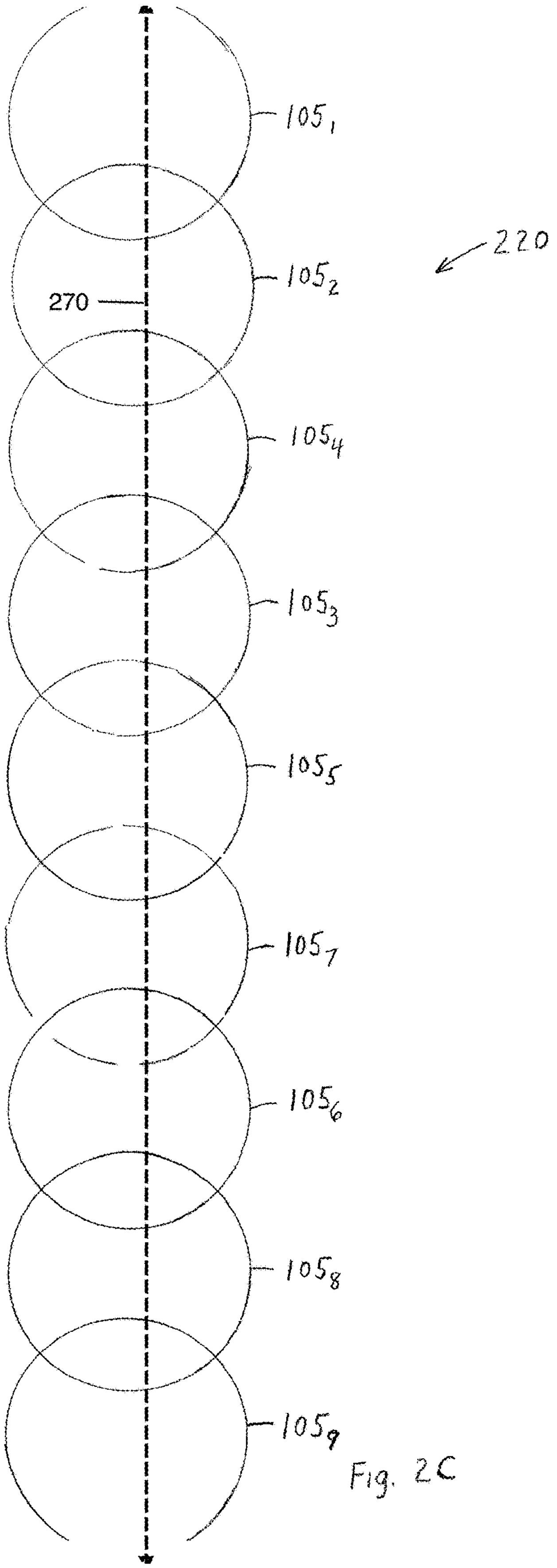
FIG. 2C is a schematic representation showing another possible relative positioning of a plurality of fields of view, in accordance with some embodiments.
Figure 2D:
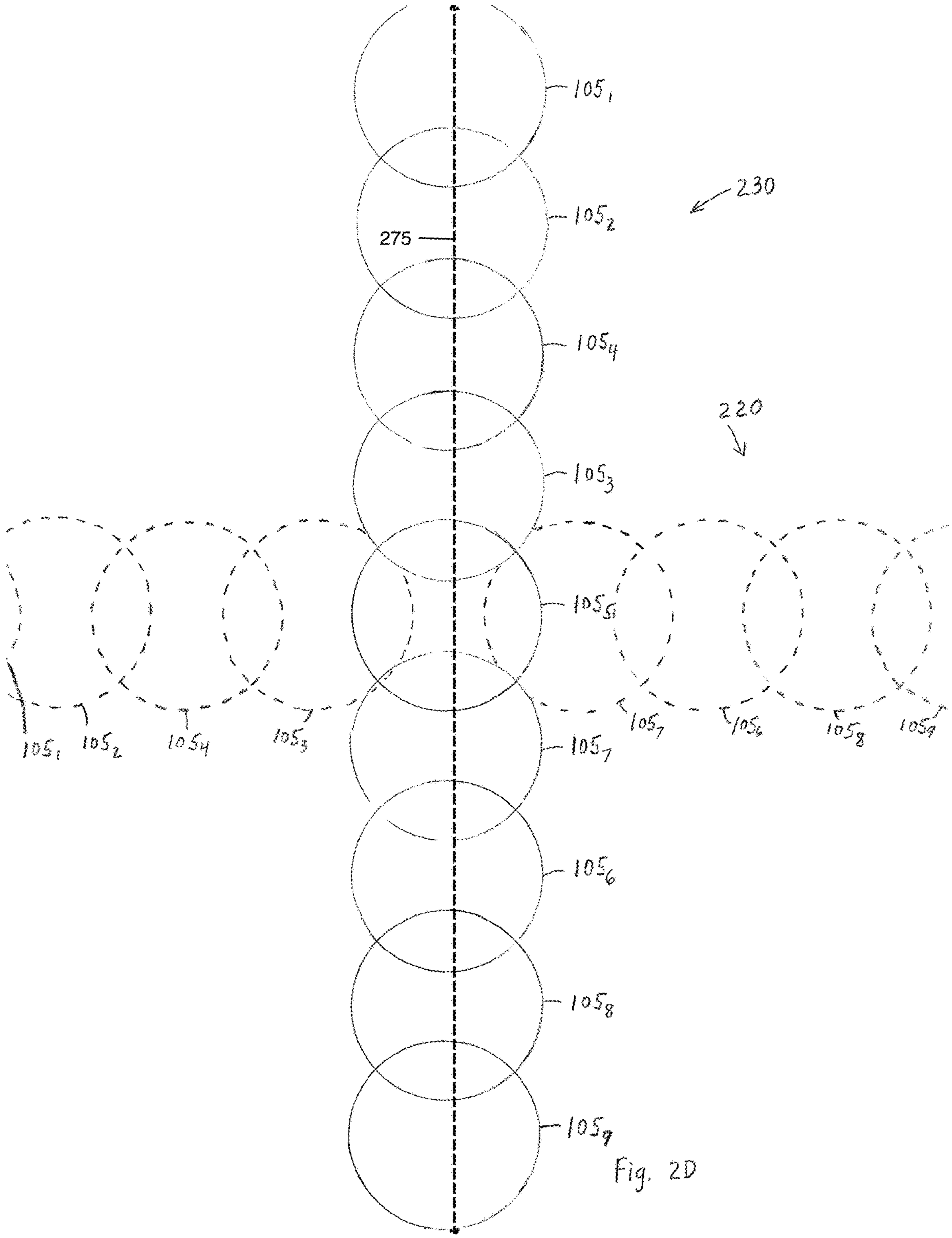
FIG. 2D is a schematic representation showing another possible relative positioning of a plurality of fields of view, in accordance with some embodiments.
Figure 2E:
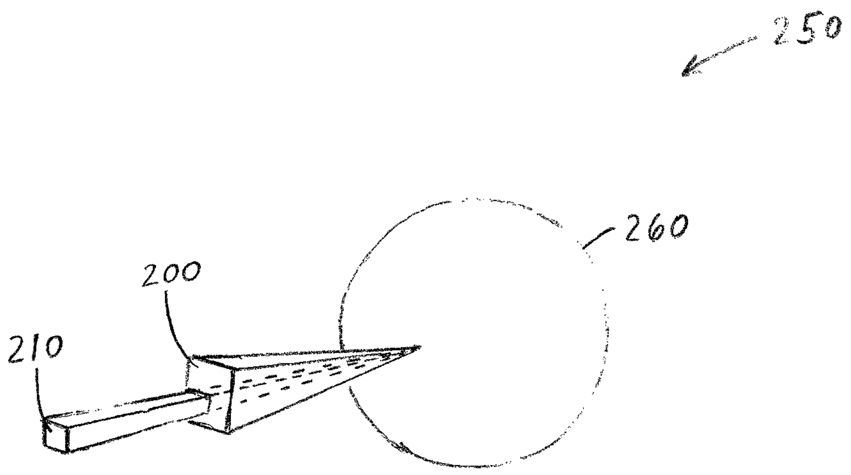
FIG. 2E is schematic representation showing a possible relationship between the fields of view in FIG. 2A, the fields of view in FIG. 2B and Earth.

FIG. 2E is a schematic representation 250 showing a possible relationship between the fields of view in representation 200 in FIG. 2A, the fields of view in representation 210 in FIG. 2B and Earth 260.

In some embodiments, the fields of view 105 may cover a 15 degree (or at least generally 15 degree) or other relatively small portion of the sky. In some other embodiments, the fields of view may cover a larger portion of the sky.

As shown in FIGS. 2A-2B, in some embodiments, the configuration of the fields of view is an array having the same number of rows and columns as the telescope array. However, this is not absolutely required. Indeed, in some embodiments, a different configuration may be desired. Thus, in some embodiments, the configuration of the fields of view may not be an array and/or may be an array having a different number of rows and/or a different number of columns from that of the telescope array.

FIG. 2C is a schematic representation 220 showing another possible positioning of the fields of view 105 called an "optical fence" or "Fence Configuration", e.g., fields of view $\mathbf{105}_1$-$\mathbf{105}_9$, of the plurality of telescopes 102, e.g., telescopes $\mathbf{102}_1$-$\mathbf{102}_9$, respectively, which is based at least in part on one possible relative positioning of the plurality of telescopes 102, e.g., telescopes $\mathbf{102}_1$-$\mathbf{102}_9$, in accordance with some embodiments.

As can be seen, in FIG. 2C, the field of view array has one column and nine rows (or alternatively, nine columns and one row), which is different than the number of rows (three) and different than the number of columns (three) in the telescope array. Alternatively, the telescope array can be configured to have nine columns and one row. For example, the fields of view $\mathbf{105}_1$-$\mathbf{105}_9$ are arranged such that a portion (e.g., the center) of each field of view passes through a central axis 270. Though representation 220 illustrates a minority of overlap between adjacent fields of view (e.g., an expanded state), in other embodiments there can be a majority of overlap between adjacent fields of view (e.g., a contracted state). The fields of view $\mathbf{105}_1$-$\mathbf{105}_9$ can also be separated to an arbitrary distance such that there is no overlap at all.

FIG. 2D is a schematic representation 230 showing another possible positioning of the fields of view 105, e.g., fields of view $\mathbf{105}_1$-$\mathbf{105}_9$, of the plurality of telescopes 102, e.g., telescopes $\mathbf{102}_1$-$\mathbf{102}_9$, respectively, which is based at least in part on one possible relative positioning of the plurality of telescopes 102, e.g., telescopes $\mathbf{102}_1$-$\mathbf{102}_9$, in accordance with some embodiments. The fields of view 105 in representation 230 are generally arranged in a column that is orthogonal to the row of fields of view 105 in representation 220, which are overlaid in dashed lines in FIG. 2D for reference. The fields of view 105 in representation 230 are arranged such that a portion (e.g., the center) of each field of view 105 passes through a central axis 275 that is orthogonal to central axis 270. It is noted that the fields of view 105 can form an optical fence that is at any angle or orientation, and thus the fields of view 105 can at different orientations than those illustrated in FIGS. 2C and 2D. For example, in FIG. 2J the fields of view 105 in representation 232 are arranged such that a portion (e.g., the center) of each field of view 105 passes through a central axis 278 that is oriented at about a 60° angle with respect to central axis 270 and at about a 30° angle with respect to central axis 275.

Figure 2F:
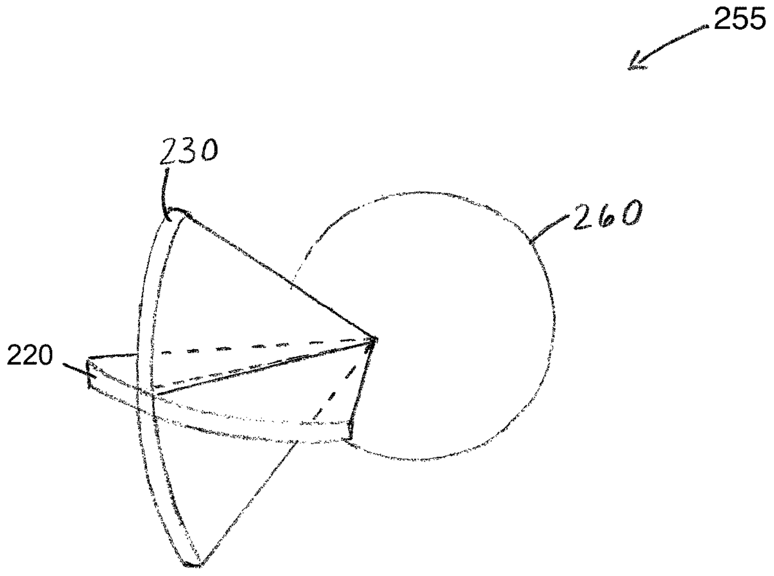
FIG. 2F is a schematic representation showing a possible relationship between the fields of view in FIG. 2C, the fields of view in FIG. 2D and Earth.

FIG. 2F is a schematic representation 255 showing a possible relationship between the fields of view in representation 220 in FIG. 2C, the fields of view in representation 230 in FIG. 2D and Earth 260.

As can be seen, in FIG. 2D, the field of view array may have a positioning that is orthogonal (or at least generally orthogonal) to the field of view array in FIG. 2C. Other relative orientations (e.g., that are not orthogonal) of the fields of view arrays in FIGS. 2C and 2D can be used in other embodiments.

The array configurations shown in FIG. 2C and FIG. 2D and any array configuration that is similar (or at least similar in effect) thereto is sometimes referred to herein as a "fence."

Figure 2G:
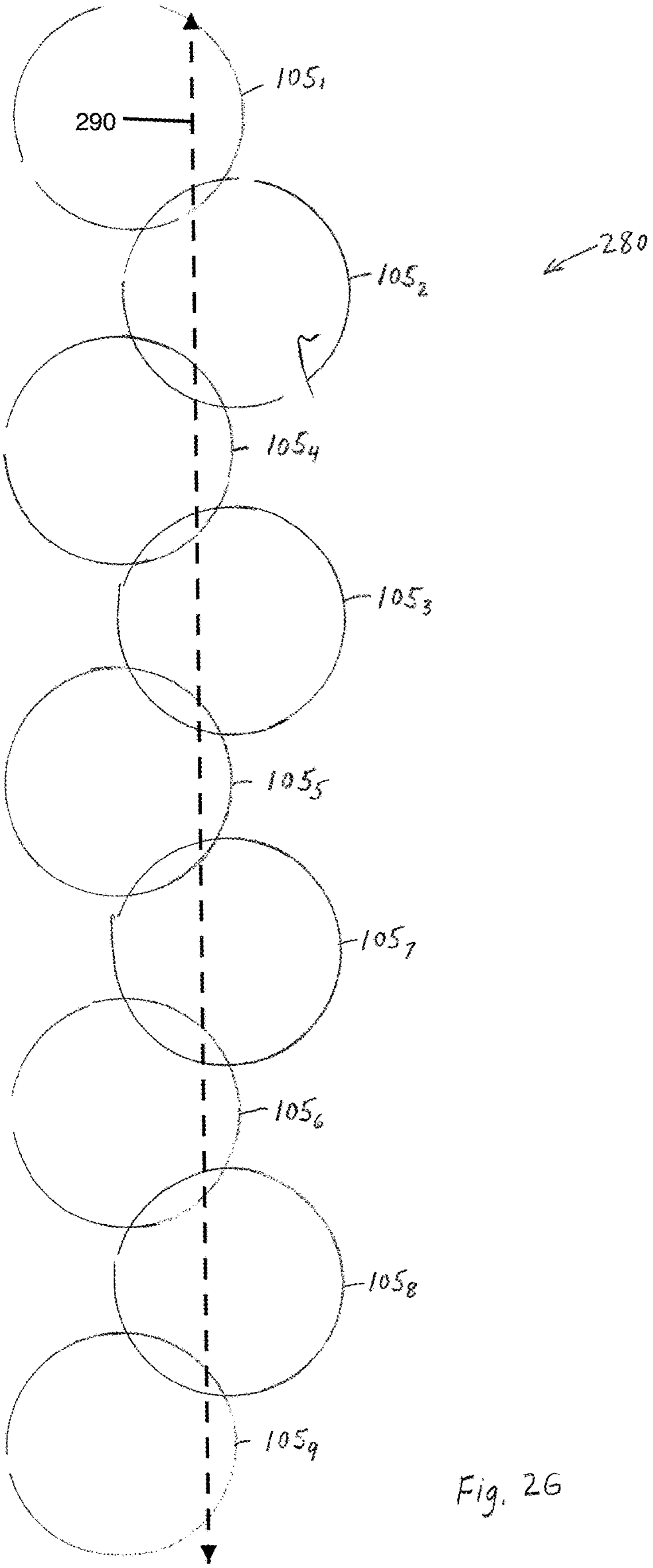
FIG. 2G is a schematic representation showing another possible relative positioning of a plurality of fields of view, in accordance with some embodiments.

Another fence configuration is shown in FIG. 2G which is a schematic representation 280 showing another possible positioning of the fields of view 105, e.g., fields of view $\mathbf{105}_1$-$\mathbf{105}_9$, of the plurality of telescopes 102, e.g., telescopes $\mathbf{102}_1$-$\mathbf{102}_9$, respectively, which is based at least in part on one possible relative positioning of the plurality of telescopes 102, e.g., telescopes $\mathbf{102}_1$-$\mathbf{102}_9$, in accordance with some embodiments. In this embodiment, the fields of view 105 are laterally offset with respect to a central axis 290 while partial overlap between neighboring fields of view is maintained. A portion of each field of view 105 passes through the central axis 290. Central axis 290 can be parallel to central axis 270 or central axis 275. Though representation 280 illustrates a minority of overlap between adjacent fields of view 105 (e.g., an expanded state), in other embodiments there can be a majority of overlap between adjacent fields of view 105 (e.g., a contracted state).

In at least some embodiments, the relative positioning of the fields of view 105 are not limited to the above. In at least some embodiments, any relative positioning of the fields of view 105 may be provided and/or used.

Referring again to FIGS. 1A-1B, the system 100 further includes a plurality of sensors (in general, sensor(s) 106) each associated with, and in a light path of, a respective one of the plurality of telescopes to receive and sample light therefrom and to output data based at least in part thereon. For example, a sensor $\mathbf{106}_1$ is associated with, and in a light path of, the telescope $\mathbf{102}_1$ to receive and sample light therefrom and to output data based in least in part thereon. A sensor $\mathbf{106}_2$ is associated with, and in a light path of, the telescope $\mathbf{102}_2$ to receive and sample light therefrom and to output data based in least in part thereon. A sensor $\mathbf{106}_3$ is associated with, and in a light path of, the telescope $\mathbf{102}_3$ to receive and sample light therefrom and to output data based in least in part thereon. And so on.

In some embodiments, the data output may represent, directly or indirectly, images such as digital images. In other embodiments, the images may represent celestial objects or aerial targets of interest such as natural or man-made airborne bodies and systems.

In at least some embodiments, each of the plurality of sensors 106, e.g., sensors $\mathbf{106}_1$-$\mathbf{106}_9$, comprises a plurality of identical (or otherwise) photodetectors (sometimes referred to as "picture elements" or "pixels") arranged in an array.

Figure 3A:
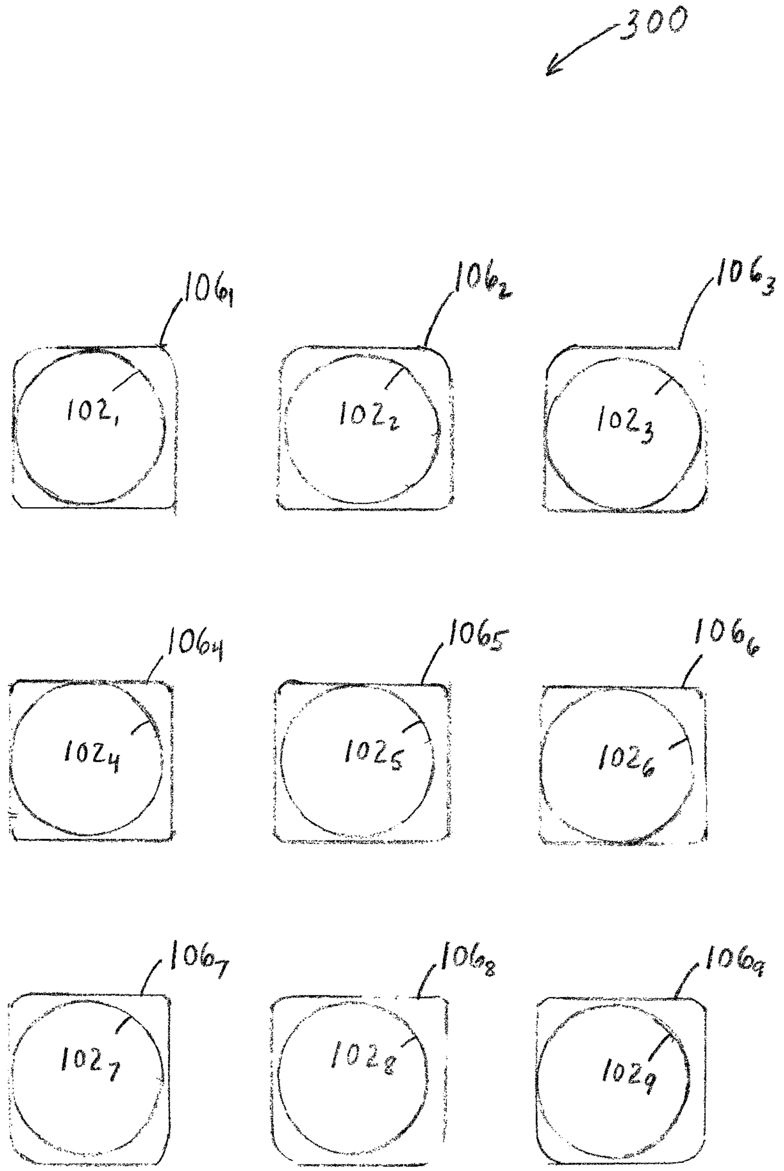
FIG. 3A is a schematic end view of a plurality of telescopes and sensors associated therewith, showing relative positioning thereof, in accordance with some embodiments.

FIG. 3A is a schematic end view 300 of the plurality of telescopes 102, e.g., telescopes $\mathbf{102}_1$-$\mathbf{102}_9$, and the sensors 106 associated therewith, e.g., sensors $106_1$-$106_9$, respectively, showing one possible relative positioning thereof, in accordance with some embodiments.

Figure 3B:
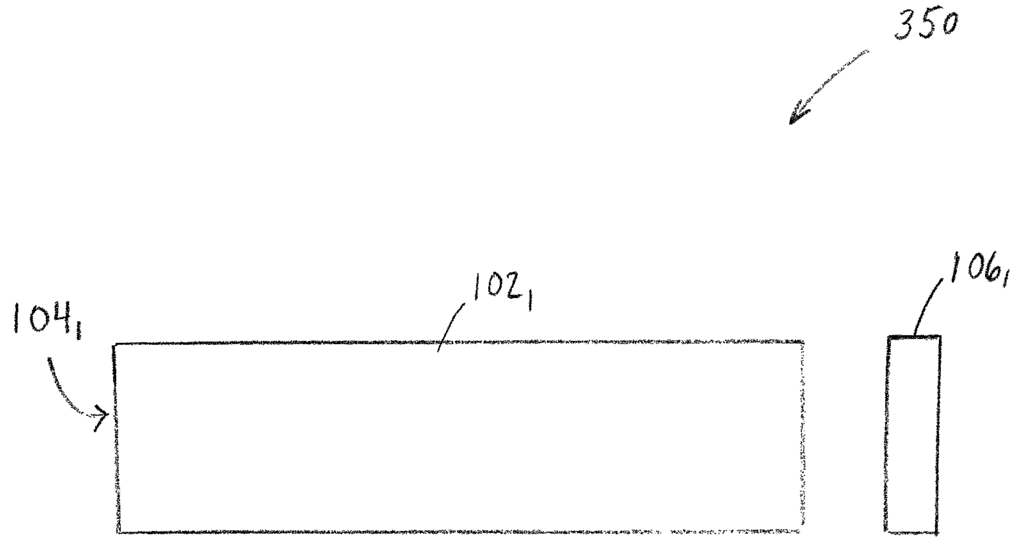
FIG. 3B is a schematic side view of a telescope and a sensor associated therewith, showing relative positioning thereof, in accordance with some embodiments.

FIG. 3B is a schematic side view 350 of one of the plurality of telescopes 102, e.g., telescope $102_1$, and the respective sensor 106, e.g., sensor $106_1$, associated therewith, showing one possible relative positioning thereof, in accordance with some embodiments.

Returning to FIGS. 1A-1B, each of the plurality of telescopes 102, e.g., telescopes $102_1$-$102_9$, and its associated sensor 106, e.g., sensors $106_1$-$106_9$, can be disposed, at least in part, in a respective one of a plurality of housings (in general, housing(s) 110), e.g., housings $110_1$-$110_9$. Each of the housings 110 may have any configuration and composition, however, in at least some embodiments, each of the plurality of housings 110, e.g., housings $110_1$-$110_9$, has a cylindrical or other tubular configuration and comprises aluminum and/or carbon fiber.

In at least some embodiments, each one of the plurality of housings 110, e.g., housings $110_1$-$110_9$, has an end that defines an opening to allow light into the one of the plurality of housings 110 and into the telescope aperture 104 of the telescope 102 disposed therein.

Figure 4:
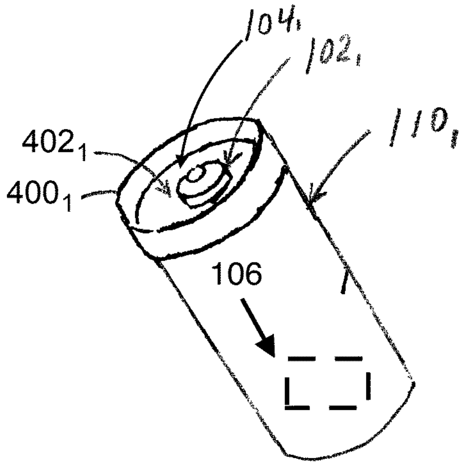
FIG. 4 is a perspective view of a housing with a telescope disposed therein, in accordance with some embodiments.

FIG. 4 is a perspective view of one of the housings, e.g., housing $110_1$, with a respective one of the telescopes, e.g., telescope $102_1$, disposed therein, and an end, e.g., end $400_1$, of the housing that defines an opening, e.g., opening $402_1$, to allow light into the housing and into the telescope aperture, e.g., telescope aperture $104_1$, of the telescope disposed therein, in accordance with some embodiments. A light sensor 106 is optionally disposed in the housing $110_1$.

Each of the plurality of housings, e.g., housings $110_1$-$110_9$, can include a removable cover, e.g., a respective one of removable covers $112_1$-$112_9$, that can be positioned over the opening defined by the end of the housing to thereby protect the telescope and/or sensor disposed therein from external objects and/or environmental conditions (e.g., precipitation), at least in part. In at least some embodiments, the removable cover is removable from the rest of the housing and re-attachable (e.g., removably re-attachable) thereto.

Referring again to FIGS. 1A-1B, the system 100 further includes a telescope positioning assembly 120 that supports (directly and/or indirectly) the plurality of telescopes, e.g., telescopes $102_1$-$102_9$, and allows for positioning (position and/or direction) and re-positioning thereof. The telescope positioning assembly 120 may include a mount 121 and a plurality of individually-adjustable telescope supports (in general, individually-adjustable telescope support(s) 126), e.g., individually-adjustable telescope supports $126_1$-$126_9$.

The mount 121 may include a base 122, a first support 123 coupled (directly and/or indirectly) to the base 122, and a second support 124 coupled (directly and/or indirectly) to the first support 123. The first support 123 and the second support 124 may be pivotably mounted to the base 122 and the first support 123, respectively, to facilitate positioning and/or repositioning of the individually-adjustable telescope supports 126, e.g., individually-adjustable telescope supports $126_1$-$126_9$, (via pivoting of the first support 123 and/or the second support 124).

The plurality of individually-adjustable telescope supports 126, e.g., individually-adjustable telescope supports $126_1$-$126_9$, may be coupled (directly and/or indirectly) to the second support 124 or other portion(s) of the mount 121.

Figure 5:
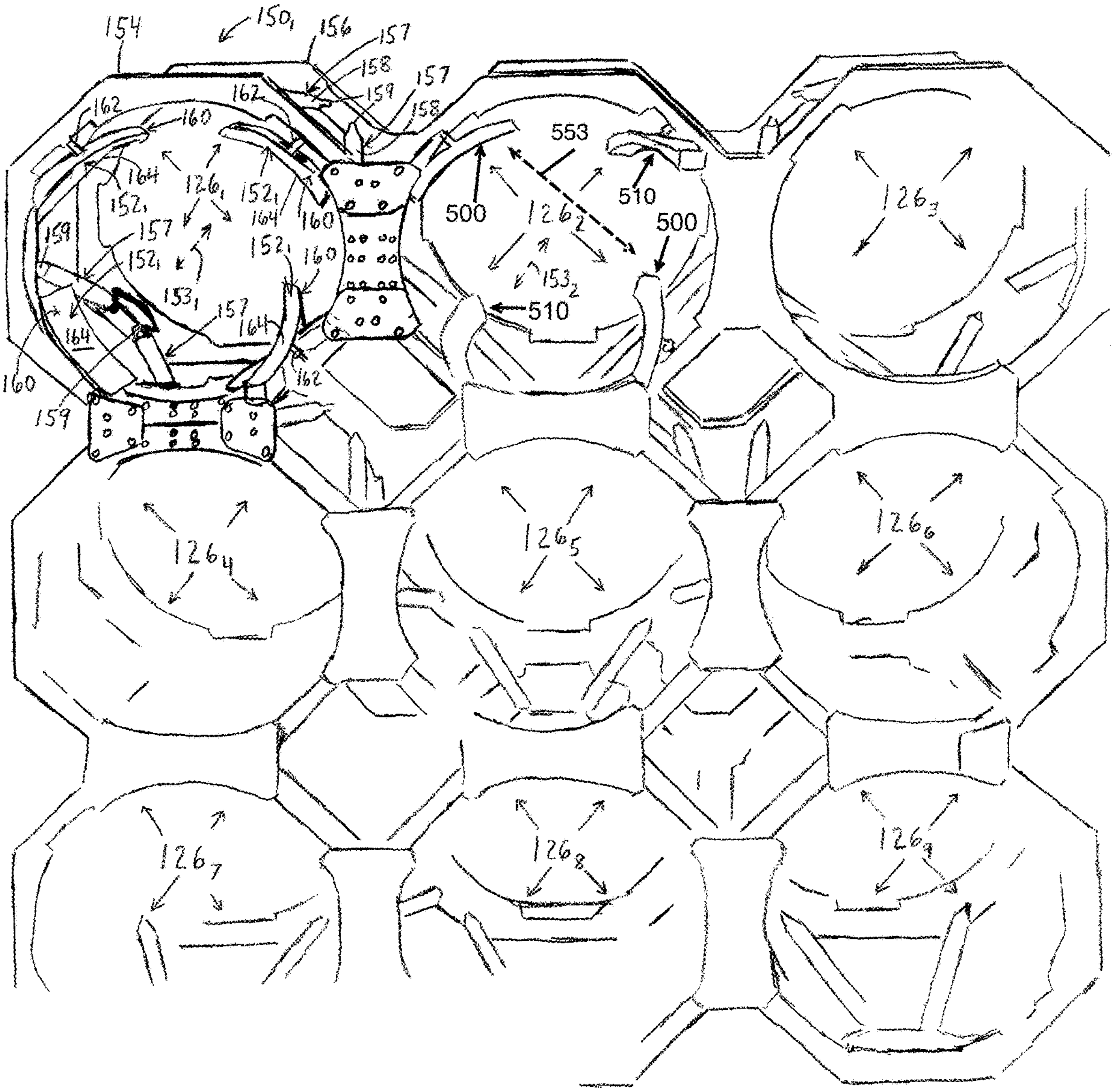
FIG. 5 is a perspective view of the plurality of individually-adjustable telescope supports, in accordance with some embodiments.

FIG. 5 is a perspective view of the plurality of individually-adjustable telescope supports 126, e.g., individually-adjustable telescope supports $126_1$-$126_9$, in accordance with some embodiments.

Each of the plurality of individually-adjustable telescope supports 126, e.g., individually-adjustable telescope supports $126_1$-$126_9$, adjustably supports (directly and/or indirectly) the respective telescope 102 in a respective positioning and is adjustable to change the respective positioning (position and/or direction) of the respective telescope 102. For example, individually-adjustable telescope support $126_1$ adjustably supports telescope $102_1$ (e.g., by supporting the housing $110_1$, which in turn supports the telescope $102_1$) and is adjustable to change a positioning of telescope $102_1$. Individually-adjustable telescope support 1262 adjustably supports telescope $102_2$ (e.g., by supporting the housing 1102, which in turn supports the telescope $102_2$) and is adjustable to change a positioning of telescope $102_2$. And so on.

As such, the system 100 allows for flexible configuration and/or reconfiguration of the plurality of telescopes and telescope apertures (sometimes referred to herein as reconfigurable telescopes, reconfigurable apertures, reconfigurable telescope array and/or a reconfigurable aperture array).

In at least some embodiments, each of the plurality of individually-adjustable telescope supports 126 may be adjusted so that each of the plurality of telescopes 102 is directed in a direction that is different, at least in part, from the direction of each of the others of the plurality of telescopes. For example, the of individually-adjustable telescope supports 126 can be adjusted so that the fields of view 105 of the telescopes 102 are arranged as in representation 200, representation 210, representation 220, representation 230, and/or representation 280.

In at least some embodiments, the telescope array 101 is modular in that one or more individually-adjustable telescope supports, housings, telescopes and sensors can be added to and/or removed from the telescope array 101 without causing any damage to the telescope array 101.

Referring again to FIGS. 1A-1B, the system 100 further includes an array processor 130, which may be coupled to the plurality of sensors, e.g., sensors sensors $106_1$-$106_9$, via a plurality of communication links 132, e.g., communication links $132_1$-$132_9$, respectively. In at least some embodiments, the array processor 130 is configured to receive data output by the plurality of sensors, e.g., sensors $106_1$-$106_9$, and to generate an image (e.g., image data) or data based at least in part thereon. In at least some embodiments, the array processor 130 may output data indicative of the image on a communication link 134. The array processor 130 can be a graphical processing unit (GPU), a system-on-a-chip (SoC), a field-programmable gate array (FPGA), or other processing unit. It should be understood that various embodiments and systems and methods may include or employ one or more of: communication and control of the system (observatory enclosure, weather system, cameras, telescope pointing and control, camera control, data uplink, power, etc.)

As stated above, each possible configuration of the fields of view may represent or otherwise be associated with a different possible operating mode of the system 100. In at least some embodiments, each operating mode may be associated with one or more objectives. One or more of the objectives of one operating mode may be different than one or more objectives of one or more other operating modes.

In view at least thereof, in at least some embodiments, the array processor 130 may be configured to further receive a signal indicating an operating mode (a current operating mode and/or a desired operating mode) of the system 100, and to generate the image based at least in part on the data output by the plurality of sensors 106, e.g., sensors $106_1$-$106_9$, and also based at least in part on the signal indicating which of a plurality of different operating modes of the system 100 is desired. In some embodiments, the operating-mode signal may be supplied to the processor via control line(s) or other communication link 136. In at least some embodiments, the signal may be supplied from any source(s) internal and/or external, including from a controller, a computer, or other processing source.

In at least some embodiments, the manner in which the array processor 130 generates the image (e.g., image data), data, and/or depends at least in part on the operating mode of the system. In at least some of such embodiments, the array processor 130 has a plurality of different operating modes each associated with a different operating mode of the system 100, and the array processor 130 generates the image (e.g., image data), data, and/or signal using the operating mode of the array processor (sometimes referred to herein as the array processor operating mode) that is associated with the operating mode of the system (sometimes referred to herein as the system operating mode) indicated by the signal received by the array processor 130.

Thus, in at least some embodiments, the array processor 130 may have a first operating mode and a second operating mode associated with first and second operating modes of the system, respectively, and may be configured to generate the image using: (a) the first array processor operating mode if the signal indicates the first operating mode for the system, and (b) the second array processor operating mode if the signal indicates the second operating mode for the system. In some embodiments, the array processor 130 may further include a third operating mode associated with a third operating mode of the system and may be further configured to generate the image using: (c) the third array processor operating mode if the signal indicates the third operating mode for the system. And so on.

In at least some embodiments, the array processor 130 may include a mapping of a relationship between operating modes of the system 100 and operating modes of the array processor 130. Such a mapping allows selection and use of an array processor operating mode that is associated with and appropriate for a given operating mode of the system 100.

The mapping may have any form, for example but not limited to, a look-up table, a curve read, a formula, logic (embodied in hardware and/or software) and/or any combination thereof. The mapping may be predetermined or adaptively determined or a combination thereof.

Figure 6:
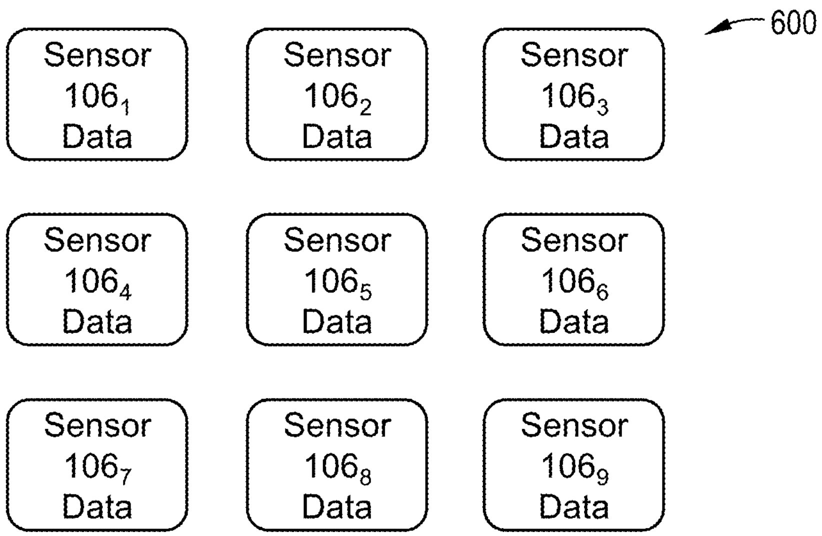
FIG. 6 is a schematic representation of data that an array processor may receive from sensors, in accordance with some embodiments.

For example, FIG. 6 is a schematic representation of data 600 that the array processor 130 may receive from the plurality of sensors 106, e.g., sensors $106_1$-$106_9$, in accordance with some embodiments.

Figure 7:
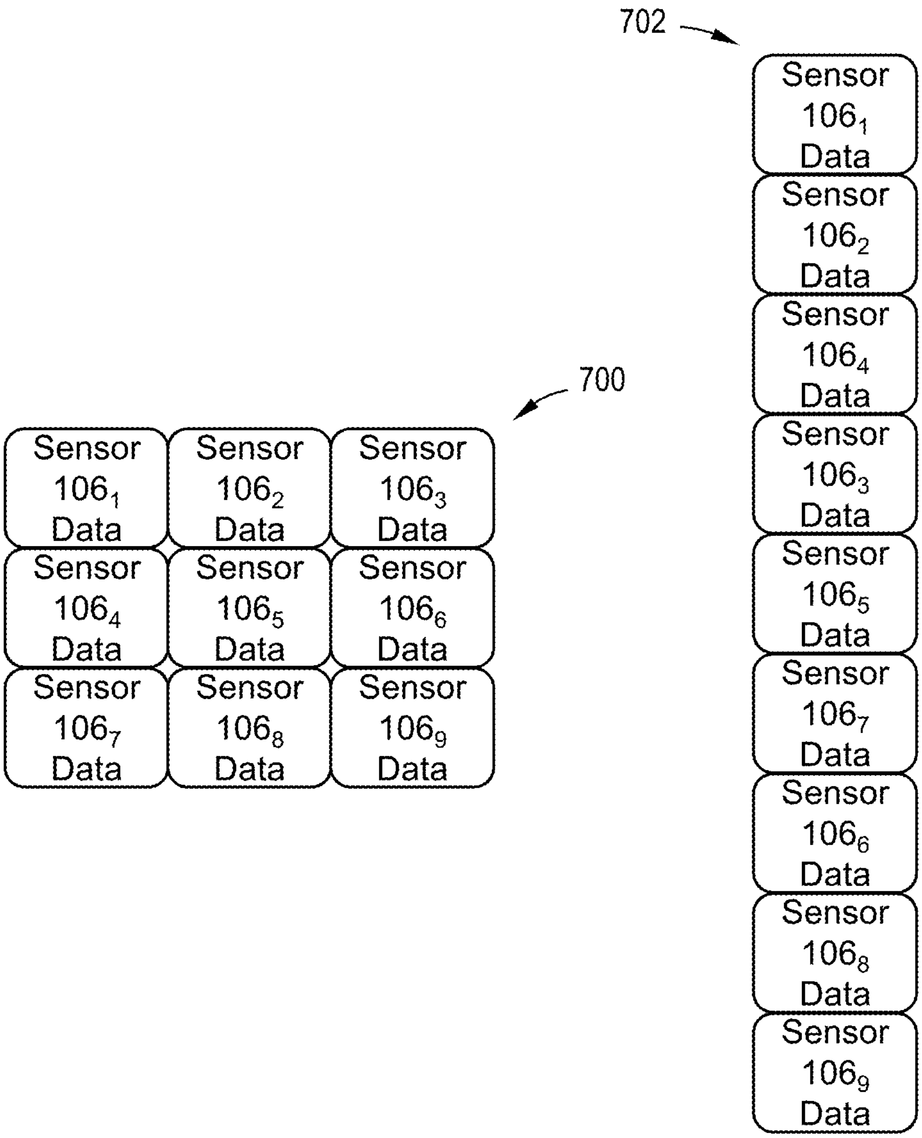
FIG. 7 is a schematic representation of two different images that the array processor may generate, in accordance with some embodiments.

FIG. 7 is a schematic representation of two different images 700, 702 that the array processor 130 may generate based at least in part on the data 600 (FIG. 6), in accordance with some embodiments.

Referring to FIG. 7, in accordance with some embodiments, if the data was generated with the fields of view positioned as shown in FIG. 2A, which for example may be associated a first operating mode of system 100, the array processor 130 may receive a signal indicating such and may use a mapping to determine that the image is to be generated using a first operating mode of the array processor 130. The array processor may then generate the image 700 based at least in part on the data from the sensors 106 and using the first operating mode of the array processor 130. It can be seen that the configuration of the image 700 corresponds at least in part to the configuration of the fields of view 105 in representation 200 illustrated in FIG. 2A of the system 100.

If on the other hand, the data was generated with the fields of view 105 positioned as shown in representation 220 illustrated in FIG. 2C, which for example may be associated a third operating mode of system 100, the array processor 130 may receive a signal indicating such and may use a mapping to determine that the image is to be generated using a third operating mode of the array processor 130. The array processor may then instead generate the image 702 based at least in part on the data from the sensors 106 and using the third operating mode of the array processor 130. It can be seen that the configuration of the image 702 corresponds at least in part to the configuration of the fields of view in the FIG. 2C of the system 100.

In at least some embodiments, the telescope positioning assembly 120 has an expanded state in which the plurality of individually-adjustable telescope supports 126 are adjusted such that the plurality of fields of view 105 collectively define a sector. In at least some embodiments, the telescope positioning assembly 120 may have an: (i) an expanded state in which the plurality of individually-adjustable telescope supports 126 are adjusted such that there is a minority of overlap between the plurality of fields of view 105, and (ii) a contracted state in which the plurality of individually-adjustable telescope supports 126 are adjusted such that there is a majority of overlap between the plurality of fields of view 105. A "minority of overlap between the fields of view" means that there is overlap in less than 50% of the total field of view of the system, including no overlap (0% overlap). Unless stated otherwise, a "majority of overlap between the fields of view" means that there is overlap in greater than 50% of the total field of view of the system up to and including a total overlap of 100%. In at least some embodiments, the expanded state defines, at least in part, or is otherwise associated with one operating mode of the system 100. In at least some embodiments, the contracted state defines, at least in part, or is otherwise associated with another operating mode of the system 100. In at least some embodiments, the array processor 130 may be configured to generate: (i) an image based at least in part on the data output by the plurality of sensors 106, e.g., sensors $106_1$-$106_9$, with the telescope positioning assembly 120 in the expanded state, and (ii) an image based at least in part on the data output by the plurality of sensors 1-6, e.g., sensors $106_1$-$106_9$, with the telescope positioning assembly 120 in the contracted state.

Referring again to FIG. 5, in at least some embodiments, each of the plurality of individually-adjustable telescope supports 126 comprises a frame (in general, frame 150), e.g., frame $150_1$ of individual adjustable telescope support $126_1$, and one or more adjustable clamps (in general, adjustable clamp(s) 152), e.g., adjustable clamps $152_1$ of individual adjustable telescope support $126_1$, to adjustably position (position and/or direct) the respective telescope 102 within the frame 150.

In at least some embodiments, each frame may be disposed about a respective longitudinal axis, e.g., longitudinal axis $153_1$ and defines an opening to receive the respective telescope (and if the telescope is disposed within a housing, the housing within which the telescope is disposed). Although the frame $150_1$ is illustrated with open sides, each frame, e.g., frame $150_1$, may have open sides, closed sides, partially open/partially closed sides or any combination thereof. In at least some embodiments, each frame includes a front portion 154 and a rear portion 156 coupled by fasteners 157. In at least some embodiments, each frame may include one or more spacers to space the front and rear portions 154, 156 from one another such that the frame has a length (in a direction parallel to the respective longitudinal axis) adapted or otherwise suitable to support the respective telescope (e.g., by itself or in a housing).

In at least some embodiments, including the illustrated embodiment, the spacers may be integral with the fasteners 157 such that the fastener is also a spacer (and sometimes referred to herein as an adapter). In at least some embodiments, each fastener may have first and second threaded ends 159 that engage first and second threaded openings 158, respectively, in the front and rear portions of the frame, respectively.

In at least some embodiments, the one or more adjustable clamp 152, e.g., adjustable clamps 152$_1$, may comprise one or more jaws or other abutments, e.g., abutments 160, and one or more adjustment mechanism, e.g., adjustment mechanisms 162, to enable movement of the one or more abutments, e.g., abutments 160, to adjust the positioning of the telescope. In at least some embodiments, each of the one or more abutments, e.g., abutments 160, comprises an abutment surface, e.g., abutment surface 164, having a configuration that is complementary to the configuration of the surface of the telescope or housing that it contacts so as to help maximize the area of contact therebetween. In at least some embodiments, the one or more adjustable clamp may comprise one or more portions that pivot and/or swivel relative to the frame to help maximize the area of contact. In at least some embodiments, the one or more adjustable clamp may comprise one or more bearings to enable such pivoting and/or swiveling.

Each clamp 152 can include a first set of abutments 500 that can adjust the position and/or orientation of the respective telescope with respect to a first axis and a second set of abutments 510 that can adjust the position and/or orientation of the respective telescope with respect to a second axis that is orthogonal to the first axis. The first and second sets of abutments lie in the plane defined by the first and second axes. For example, the first set of abutments 500 can adjust the position and/or orientation of the respective telescope 102 with respect to the longitudinal axis 153 and the second set of abutments 510 can adjust the position and/or orientation of the respective telescope 102 with respect to a latitudinal axis 553. The longitudinal axis 153 and the latitudinal axis 553 are orthogonal to each other. The abutments 500, 510 can be jaws or other structures in some embodiments.

In at least some embodiments, the adjustment mechanism enables movement of the one or more abutment in one or more directions having a radial component (i.e., a radially inward component and/or a radially outward component).

Referring again now to FIG. 1B, in at least some embodiments, each of the one or more adjustment mechanisms, e.g., adjustment mechanisms 162, is a manual adjustment mechanism. In some such embodiments, each manual adjustment mechanism may comprise one or more bolts, e.g., bolts 166, or one or more other threaded members that are movable in one or more directions having a radial component (i.e., a radially inward component and/or a radially outward component) to allow movement of the one or more abutments in one or more directions having a radial component.

In at least some embodiments, at least some of the one or more adjustment mechanisms may comprise one or more actuators that may be activated to cause (directly and/or indirectly) relative movement and/or positioning (e.g., of the one or more abutments, e.g., abutments 160) of the clamp (e.g., clamp 152$_1$) to adjust the positioning (e.g., orientation) of the telescope.

Figure 8:
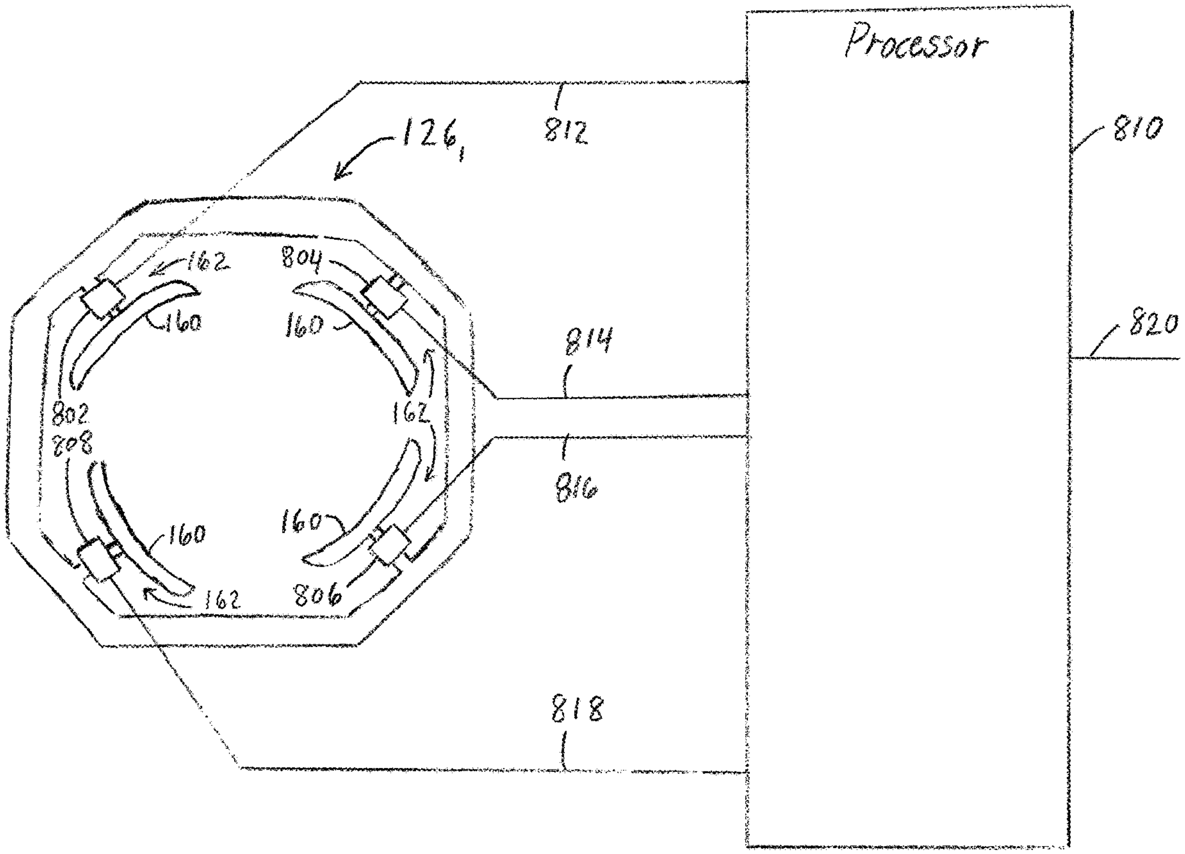
FIG. 8 is schematic block diagram view of an individually-adjustable telescope support, in accordance with some embodiments.

FIG. 8 is a perspective view of one of the plurality of individually-adjustable telescope supports 126, e.g., individually-adjustable telescope support 126$_1$, in accordance with some embodiments. The individually-adjustable telescope support 126, e.g., individually-adjustable telescope support 126$_1$, in FIG. 8 is the same as or similar to the individually-adjustable telescope support 126$_1$ in FIG. 5, the difference being that the one or more adjustment mechanisms 162 of the individually-adjustable telescope support 126$_1$ in FIG. 8 comprise one or more actuators, e.g., actuators 802, 804, 806, and 808, rather than, or in addition to, manual adjustment mechanisms.

Referring to FIG. 8, in accordance with some embodiments, the one or more actuators, e.g., actuators 802, 804, 806, and 808, are configured to provide (directly and/or indirectly) movement of the respective telescope 102$_1$ (e.g., via movement of the one or more abutments, e.g., abutments 160) or other relative movement between the respective telescope 102$_1$ and the individually-adjustable telescope support 126$_1$ based at least in part on one or more actuator control signals.

In at least some embodiments, a change in one or more of the actuator control signals results in movement of one or more of the one or more abutments in one or more directions having a radial component.

The actuators, e.g., actuators 802, 804, 806, and 808, may be coupled to a controller or other type of processor 810, via control lines or other communication links 812, 814, 816, and 818, respectively. In at least some embodiments, the processor 810 may comprise the array processor 130 (FIG. 1A).

In operation, a control signal may be supplied on a control line or other communication link 820. The control signal may indicate a desired operating mode of the system 100 and/or a positioning desired for the respective telescope 102$_1$. The processor 810 may receive the control signal and determine one or more actuator control signals based at least in part thereon. The actuator control signals may be adapted to control (e.g., activate) one or more of the actuators 802, 804, 806, and 808 to provide (directly and/or indirectly) a desired positioning of the respective telescope 102$_1$.

Unless stated otherwise, a signal (control or otherwise) may have any form, for example, analog and/or digital, and is not limited to a single signal on a single line but rather, for example, may comprise multiple signals on a single line or multiple signals on multiple lines. Also, unless stated otherwise, a signal (control or otherwise) may have any source(s), internal and/or external.

The one or more actuators, e.g., actuators 802, 804, 806, and 808, may receive the one or more actuator control signals via control lines or other communication links 812, 814, 816, and 818, respectively, and may provide relative movement between the respective telescope 102$_1$ and the individually-adjustable telescope support 126$_1$ based at least in part thereon.

It at least some embodiments, the processor 810 may include a mapping of a relationship between: (a) operating modes of the system 100 and/or positioning that may be desired for the respective telescope and (b) actuator control signals to provide or help provide such. The mapping may have any form, for example but not limited to, a look-up table, a curve read, a formula, logic (embodied in hardware and/or software) and/or any combination thereof. The mapping may be predetermined or adaptively determined or a combination thereof.

The one or more actuators may comprise any type(s) of actuator(s). In some embodiments, one or more of the actuators may comprise one or more motors (linear and/or rotary), solenoids, pneumatic actuators, hydraulic actuators, magnetic actuators, diaphragm actuators, piezo electric actuators, ferroelectric actuators and/or MEMS actuators.

In at least some embodiments, one or more of the plurality of individually-adjustable telescope supports may further comprise one or more position sensors to provide one or more feedback or other position signals that may be used in control of the one or more actuators. In some embodiments, each of the individually-adjustable telescope supports may further comprise one or more position sensors to provide one or more feedback or other position signals that may be used in control of the one or more actuators.

Figure 9:
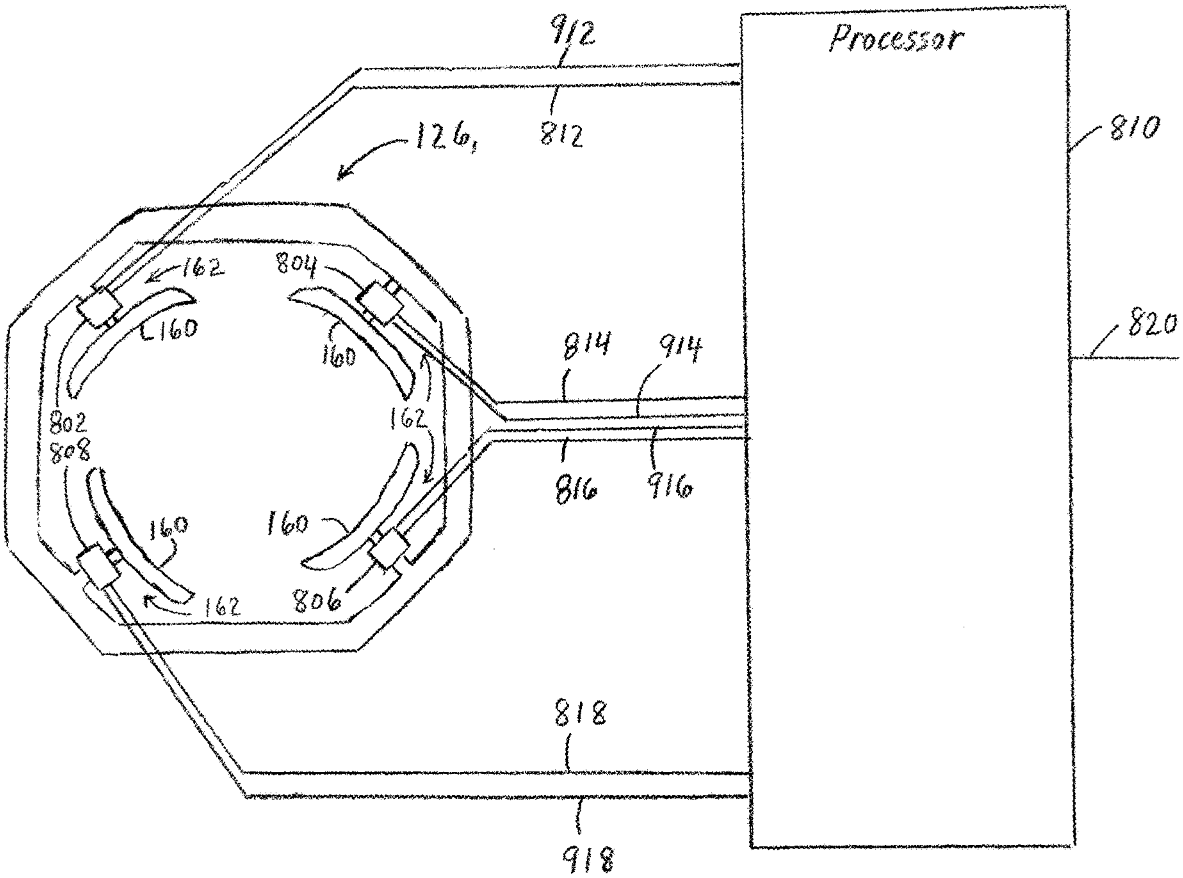
FIG. 9 is schematic block diagram view of another individually-adjustable telescope support, in accordance with some embodiments.

FIG. 9 is a perspective view of one of the plurality of individually-adjustable telescope supports, e.g., individually-adjustable telescope support 126$_1$, in accordance with some embodiments. The individually-adjustable telescope support 126, e.g., individually-adjustable telescope support 126$_1$, in FIG. 9 is similar to the individually-adjustable telescope support 126$_1$ in FIG. 8, the difference being that the individually-adjustable telescope support 126$_1$ in FIG. 9 further includes position sensors (e.g., integral with actuators 802, 804, 806, and 808) to provide one or more feedback or other position signals that may be used in control of the one or more actuators 802, 804, 806, and 808. The position signals output by each position sensor can represent the absolute or relative position of the respective actuator. Alternatively, the position sensors can be separate from the actuators.

Referring to FIG. 9, in accordance with some embodiments, the position sensors (e.g., integral with actuators 802, 804, 806, and 808) are electrically coupled to the controller or other processor 810, via signal lines or other communication links 912, 914, 916, and 918, respectively. In addition, the position sensors are electrically coupled to the actuators.

Operation may be similar to that described above with respect to FIG. 8, except that the processor 810, may further receive the position signals from the position sensors and determine the one or more actuator control signals based at least in part on the signal (indicating a desired operating mode of the system 100 and/or a positioning desired for the respective telescope 102) and the position signals.

The one or more position sensors may comprise any type(s) of position sensor(s). In some embodiments, one or more of the position sensors may not be integral with one or more of the actuators.

In at least some embodiments, at least some of the individually-adjustable telescope supports 126, e.g., individually-adjustable telescope supports 126$_1$-126$_9$, may have a configuration that is similar to and/or the same as the configuration described herein for the individually-adjustable telescope support 126$_1$.

Figure 10:
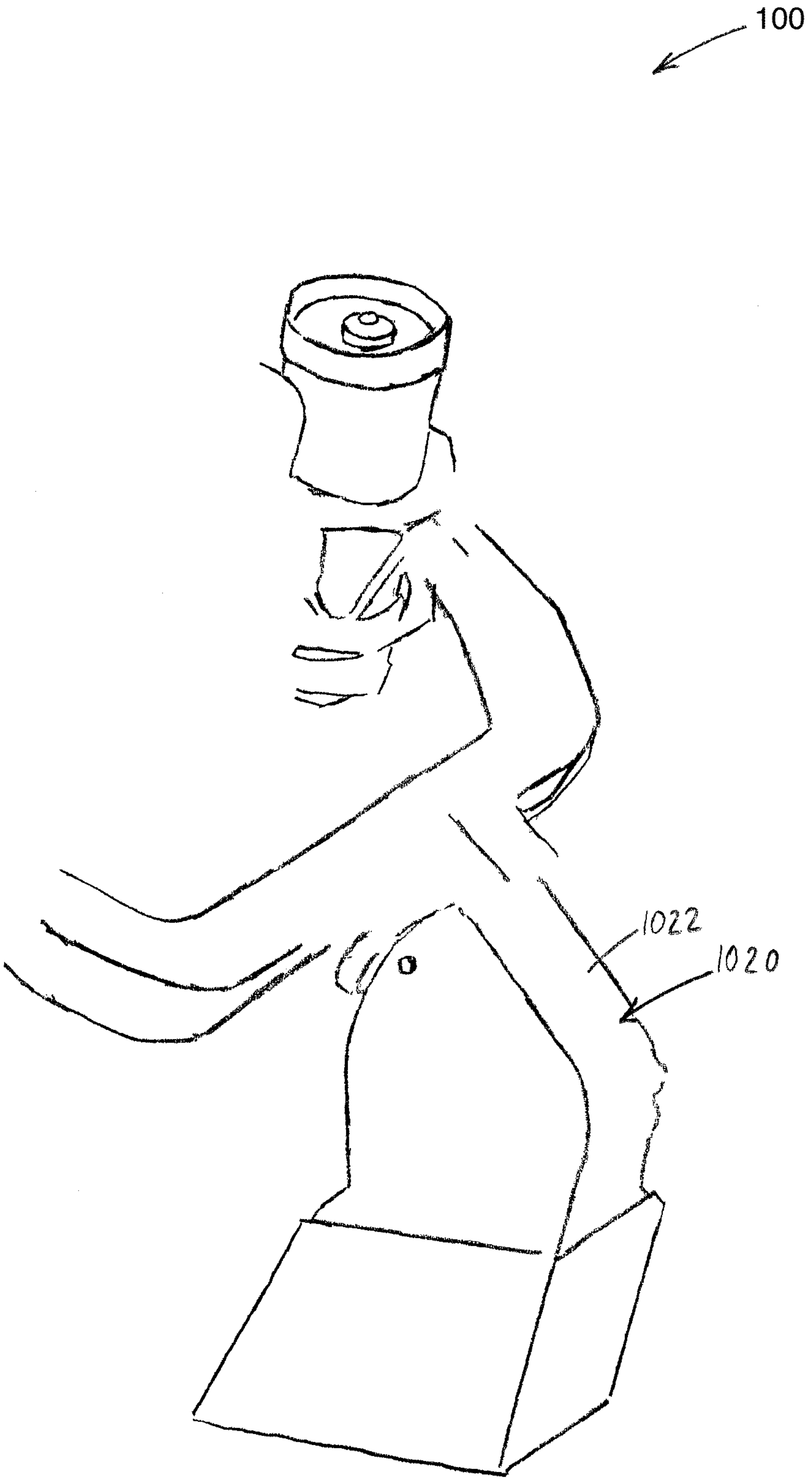
FIG. 10 is a perspective view of an alternative telescope positioning assembly, in accordance with some embodiments.

FIG. 10 is a perspective view of the system 100 with an alternative telescope positioning assembly 1020, in accordance with some embodiments. The telescope positioning assembly 1020 may be similar to telescope positioning assembly 120 shown in FIG. 1A, the difference being that the telescope positioning assembly 1020 shown in FIG. 10 comprises a base 1022 that is different in one or more respects (e.g., taller) than the base 122 of the telescope positioning assembly 120 shown in FIG. 1A.

The system 100 is not limited to nine telescopes and nine sensors. In some embodiments, the system 100 may include less than nine telescopes and nine sensors. In some embodiments, the system 100 may include greater than nine telescopes and nine sensors. In some embodiments, e.g., as shown in FIG. 11, the system 100 may comprise twenty telescopes and twenty sensors.

Moreover, in at least some embodiments, the telescope positioning assembly, e.g., telescope positioning assembly 120 and/or telescope positioning assembly 1020, may include a tracking system configured to move the individually-adjustable telescope supports at a controlled rate along a controlled path.

Figure 11:
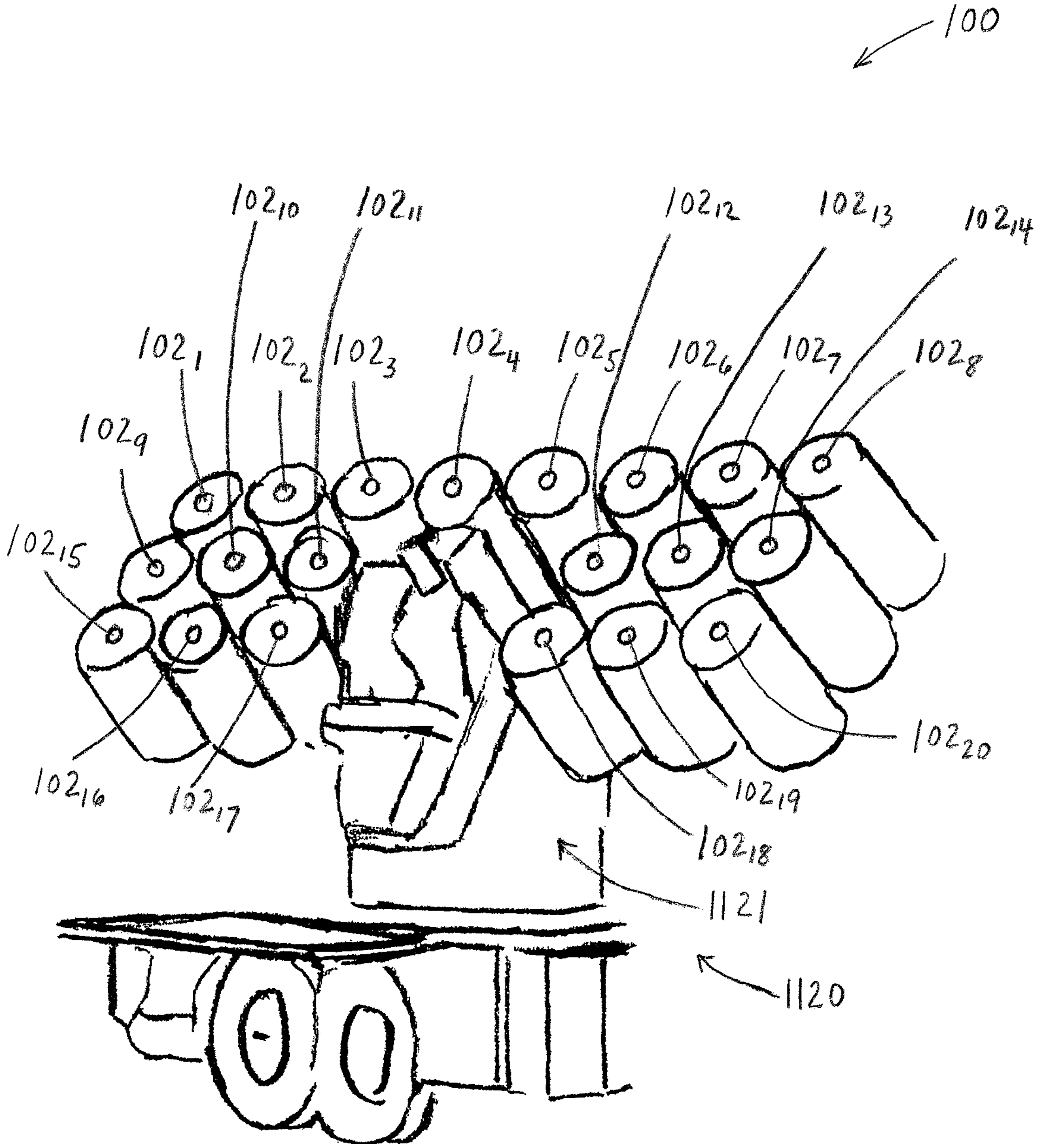
FIG. 11 is a perspective view of a telescope positioning assembly that includes a mount with a tracking system, in accordance with some embodiments.

FIG. 11 is a perspective view of the system 100 with an alternative telescope positioning assembly 1120, in accordance with some embodiments. The telescope positioning assembly 1120 may be similar to telescope positioning assembly 120 shown in FIG. 1A and/or FIG. 10, one difference being that the telescope array in FIG. 11 has a different configuration (e.g., non-uniform array with three rows and empty locations, or viewed alternatively, three separate arrays, e.g., 3×3, 1×2 and 3×3 or 2×3, 1×8 and 2×3) than that of the telescope array shown in FIGS. 1A-1B, another difference being that the mount 1121 of the telescope positioning system 1120 includes a tracking system configured to move the individually-adjustable telescope supports (which support and position a plurality of telescopes, e.g., telescopes 102$_1$-102$_{20}$) at a controlled rate along a controlled path, in accordance with some embodiments. In at least some embodiments, the mount 1121 comprises a tracking mount of suitable design, in some examples a Kineto Tracking Mount (KTM) available from L3Harris Technologies, Inc.

In at least some embodiments, the telescope positioning assembly, e.g., telescope positioning assembly 120, telescope positioning assembly 1020 and/or telescope positioning assembly 1120, may comprise an integrated fiberglass clamshell enclosure that is weatherproof (e.g., waterproof) and enables operation without a dome, concrete pad, or roll-off structure.

In at least some embodiments, a system transport vehicle may be provided to transport the system 100. In at least some embodiments, such a system transport vehicle may comprise a truck, rail car, mobile intermodal container, or trailer that provides an integrated transporter/shelter that enables the system 100 to be mobile and deployable via road, sea, and/or air without disassembly of the system 100.

In at least some embodiments, the system transport vehicle may comprise a KTM trailer or other trailer or motorize vehicle that comprises a purpose-built enclosure and electrically-operated leveling jacks, and forms an integrated transporter/shelter, enabling tactical utility and reducing cost and maintenance of a traditional dome or roll-off roof structure.

In at least some embodiments, each of the plurality of telescopes is a 0.36 meter aperture, f/2.2 telescope. However, the plurality of telescopes may or may not be identical to one another. In at least some embodiments, each of the plurality of telescopes may comprise any type of telescope. One exemplary and non-limiting example uses 0.28 meter aperture f/2.2 telescopes, but other examples and dimensions may apply in certain contexts and implementations.

In at least some embodiments, each sensor is a sensor with high sensitivity, low noise, wide dynamic range, and the ability to take large numbers of short exposures at high duty cycle. In at least some embodiments, each sensor 106 may comprise an EMCCD (electron multiplying charge coupled device), CMOS (complementary metal-oxide-semiconductor), or SPAD (single photon avalanche detector) sensor. In at least some embodiments, the sensor may comprise a wavefront sensor. In at least some embodiments, such a sensor is fully illuminated in the unvignetted field of sub-aperture telescopes. In some embodiments, such a sensor is not fully illuminated and deliberately overfills the unvignetted field of sub-aperture telescopes, providing areas of additional off-axis field of view at lower signal-to-noise ratio.

The plurality of sensors 106 may or may not be identical to one another. In at least some embodiments, each sensor 106 may comprise any type of sensor.

Likewise, the plurality of individually-adjustable telescope supports may or may not be identical to one another. In at least some embodiments, each individually-adjustable telescope support may comprise any type of individually-adjustable telescope support.

The telescope positioning assembly may comprise any type of telescope positioning assembly.

In one or more embodiments, data can be mapped and fused or combined in memory before writing it to a storage device such as a hard drive or sending the same to a network storage media, e.g., to storage available over the network cloud. The fusing/combining may be performed in high-speed custom processors. In an aspect, this allows the system to operate in real-time or near real-time with respect to the user's experience.

The system is configured and arranged to perform a process in suitable hardware and using suitable programming steps for a) positioning the plurality of individually-adjustable telescope supports (setting the mode) b) calibrating and characterizing the fields of view, c) focusing each field separately, d) taking the images (data), e) using the known star positions on each individual sub-image to rectify each sub-image to compensate for different field distortions of each telescope, f) fuse/combine the data into an image (e.g., image data) or dataset, g) use the imaged stars and a known star database to "plate solve" the image to automatically determine the astronomical location of each pixel on the field of view (e.g., the whole sky or portion thereof), g) identify a plurality of objects or phenomena observed in the image, h) determine if anything expected to be in the image is missing, i) determine if anything in the image has changed color or brightness compared to a previous or expected image, j) save the image and/or data to media, k) communicate important data in real-time or in near real-time, and/or l) use this data to reschedule another image (or not).

In one or more embodiments, some major steps and sub-steps are employed, which can be modified by one of skill in the art or re-arranged as necessary for a particular application. For example:

(A) Calibration. Calibration may be accomplished by: concentrating all apertures so that they are co-aligned; setting the temperature of the camera focal planes at the expected set point(s) for a viewing time (e.g., an evening time); pointing the telescopes at a field of objects (e.g., stars), or optionally at an evenly-illuminated field; setting the telescope focus at or near infinity; taking standard dark frames, bias frames, and flat frames for each camera; focusing the telescopes automatically based on any suitable focusing technique; taking a short exposure of the star field using each aperture; "plate solving" each image such that the computer automatically identifies the stars and their expected positions; comparing the measured sub-pixel star locations compared to an expected "catalog" position(s) to determine a polynomial fit of two-dimensional (2D) focal plane distortions for each camera; and storing the spatial and intensity calibration data.

(B) Collection of data and calibration. Data collection and calibration may be accomplished by: pointing the array to a desired point or target; capturing simultaneous or non-simultaneous images with each aperture and/or sensor in the array; applying the different distortion maps for each aperture/sensor to rectify the respective images so that each image's star position conforms to the star catalog and that all apertures can be combined with one another; comparing the images to remove errors found only in single apertures (e.g., cosmic ray hits which may appear as bright points but only exist in one image); combining the corrected images in memory (e.g., random access memory, RAM) without having to go through the computationally-demanding or time-consuming process of writing them to hard disk or solid state memory devices, or storing the data and combining the corrected images at a later time.

(C) Analyzing the data. For a condensed field of view, data analysis may be accomplished by: scaling up each image to a multiple of its original size (e.g., using polynomial interpolation); combining all images into a single synthetic exposure with higher SNR than the individual images; extracting the positions of all detected objects on the frame; identifying all stars expected on frame from an astronomical database; recording the brightness and position and color of any detected objects on the frame; recording any expected objects that are "missing" from the frame compared to the astronomical database; recording any streaks caused by fast moving objects in the frame; recording any expected objects that have changed brightness or color or position from known values; excluding aircraft and other atmospheric objects from objects detected in space (this can be done by comparing simultaneous images of the sky taken from two locations multiple kilometers apart for example). In some aspects, if the combined frame shows no unexpected objects or absences, the resulting synthesized image may or may not be stored, and the system moves to the next image or sequence. If the combined frame contains unexpected objects or absences, save the frame and the data containing information on brightness, color, location, or other anomalies. Use the result to schedule repeat image(s) of this field of view as needed before moving on the next target in queue. Communicate any detections in real time and store the data in the header of the single combined frame. A second set or further set(s) of images as above may be collected in quick succession, synthesizing a second or further combined frame(s), and following the same outline as above. Two or more combined frames may be compared to detect any differences between frames, and to generate light curves of objects in the images.

(D) Analysis for "wide open" or linear "fence" or other arrangements of apertures. This can be achieved by: after capturing the (M×N) images (which correspond to the configuration of the telescope array), scaling up each image to a multiple of its original size using polynomial interpolation; aligning the images on the edges and corners to mosaic together a wider field of view or linear field of view; extracting the positions of all detected objects on each frame; identify all stars expected on frame from an astronomical database; recording the brightness and position and color of any detected objects on the frame; recording any expected objects that are "missing" from the frame compared to the astronomical database; recording any streaks caused by fast moving objects in the frame; recording if any expected objects have changed brightness or color or position from expected values; excluding aircraft and other atmospheric objects from objects detected in space (this can be done by comparing simultaneous images of the sky taken from two locations multiple kilometers apart for example); and taking a second (or further) array image(s) in quick succession and compare them to the above. If the compared mosaic frames show no unexpected objects or absences, the resulting image may or may not be stored, and move to the next image or sequence. If the combined frame contains unexpected objects or absences, save the frame and the data containing information on brightness, color, location, or other anomalies. Use the result to schedule repeat image(s) of this field of view or a subset of the field of view as needed before moving on the next target in queue. Communicate any detections in real time and store the data in the header of the single combined frame. A second set or further set(s) of images as above may be collected in quick succession, synthesizing a second or further combined frame(s), and following the same outline as above. Two or more combined frames may be compared to detect any differences between frames, and to generate light curves of objects in the images.

In at least some embodiments, the system 100 may be coupled to a network and may provide images generated by the array processor 130 to the network.

Figure 12:
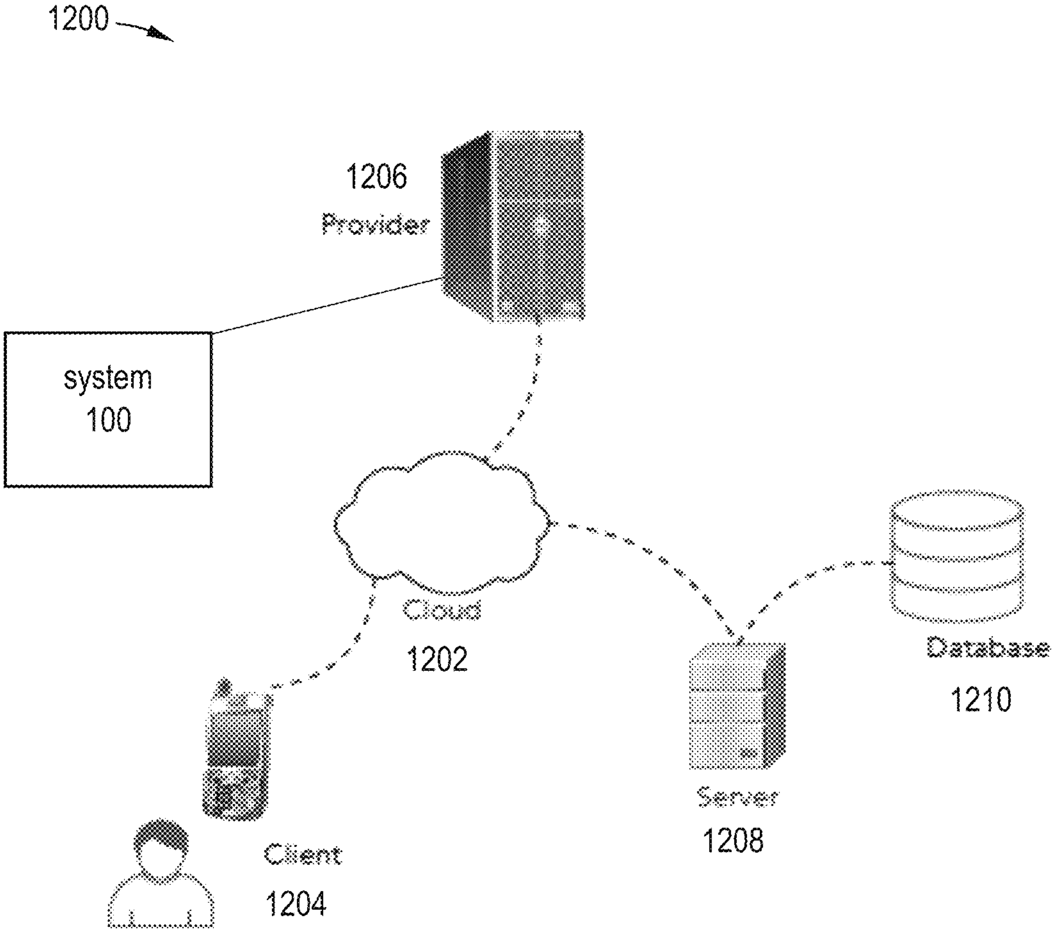
FIG. 12 illustrates an exemplary network architecture, in accordance with at least some embodiments.

FIG. 12 illustrates an exemplary network architecture 1200 that may be used in association with one or more methods and systems disclosed herein, in accordance with at least some embodiments.

Referring now to FIG. 12, in accordance with some embodiments, the architecture 1200 may include a cloud-based (networked) communication network 1202, which may include one or several wired, wireless, local or wide area network components and network communication infrastructure. The network 1202 may deliver data and information at least among the interconnected components shown. The network may include the Internet, World Wide Web, cellular, Wi-Fi, corporate, private, public, government networks, or combinations thereof using any one or more accepted communication protocols. Preferably the connections to the network 1202 are secure or authenticated to avoid losses or privacy concerns.

The network architecture 1200 may further include a party such as, for example, a client or other user 1204, who may connect to the network 1202 using their user device 1204. The user device is equipped with hardware and software so as to support said communication and so as to present and process information relating to one or more of the methods and/or systems described herein. In at least some embodiments, the user device may provide a graphical user interface (GUI) and/or other input/output (I/O) capability to assist the user of the device in interacting with the network architecture 1200.

The network architecture 1200 further includes a provider 1206 of one or methods and/or systems described herein, which may connect to the network 1200 to provide images generated by the array processor 130 as described herein and/or to provide and/or exchange other information.

The network architecture 1200 may further include a server 1208, which may include a storage unit or database 1210, which may store information relating to any of the above, rules in a rules engine, and/or other information (data and/or instructions) to coordinate and facilitate the overall operation of the architecture 1200.

Figure 13:
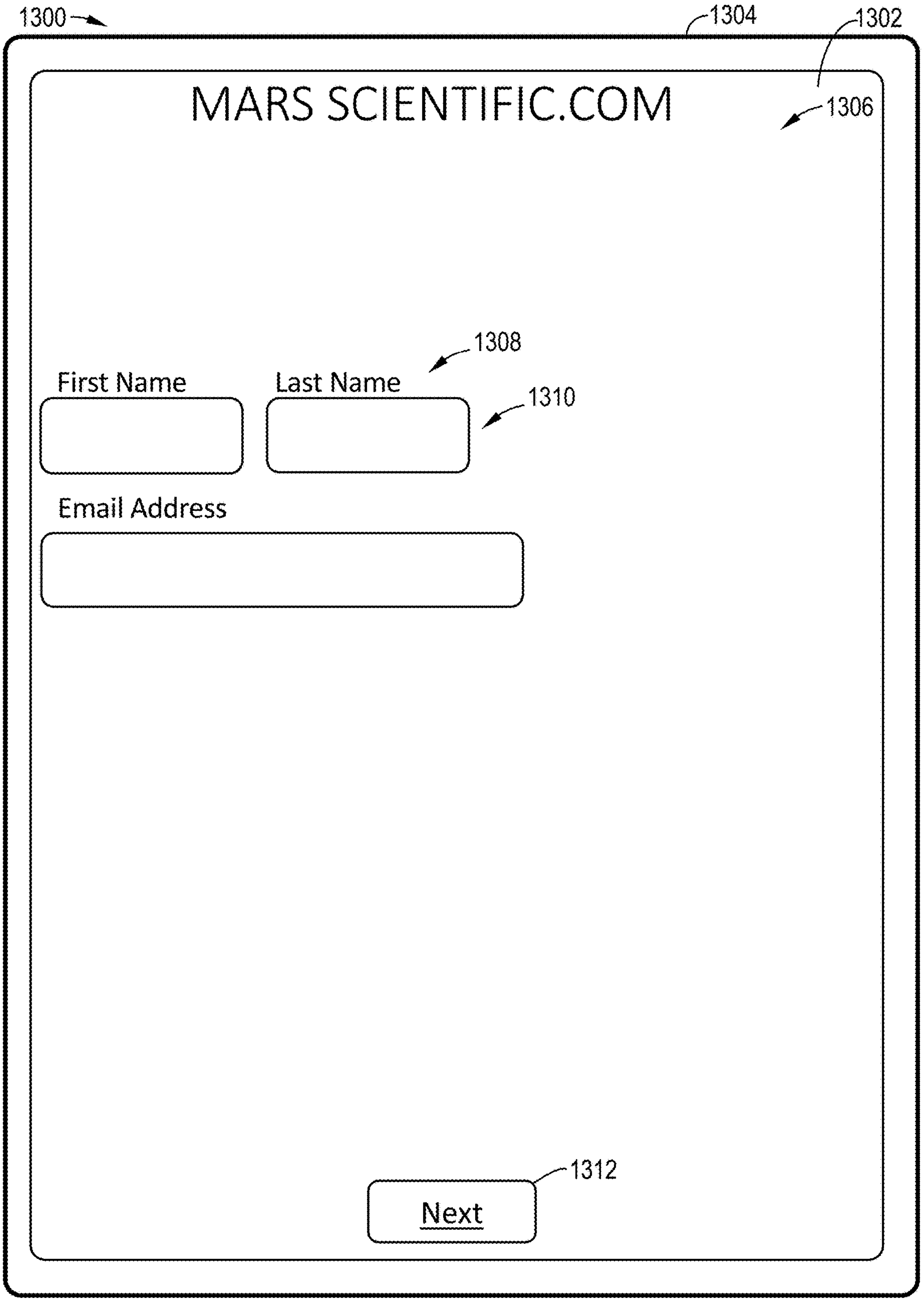
FIG. 13 is a schematic representation of a computing device displaying a view, in accordance with some embodiments.

FIG. 13 is a schematic representation of a computing device 1300, in accordance with some embodiments. In at least some embodiments, the computing device 1300 may be the user device of client or user 1204 (FIG. 12).

Referring now to FIG. 13, the computing device 1300 may include a display 1302, a camera (not shown), a speaker (not shown), a microphone (not shown), an on/off button (not shown) that can be activated to turn the computing device 1300 on and off, and a case 1304 that supports (directly and/or indirectly) each of the above.

The display 1302 is shown displaying a view 1306 that may be generated and/or displayed at, or otherwise in association with, a process for registering and/or establishing an account. In particular, the view 1306 includes one or more prompts 1308 or other instructions for the user in regard to registering and/or establishing an account, and further includes one or more graphical tools 1310, which may be selected or otherwise activated (e.g., by a tap, entering information or other gesture and/or any combination thereof) by a user to indicate or otherwise provide a selection and/or other requested information.

The view may further include a graphical tool 1312, which may be activated by a user to indicate a desire to proceed or otherwise navigate to another (e.g., next) view in the graphical user interface.

Figure 14:
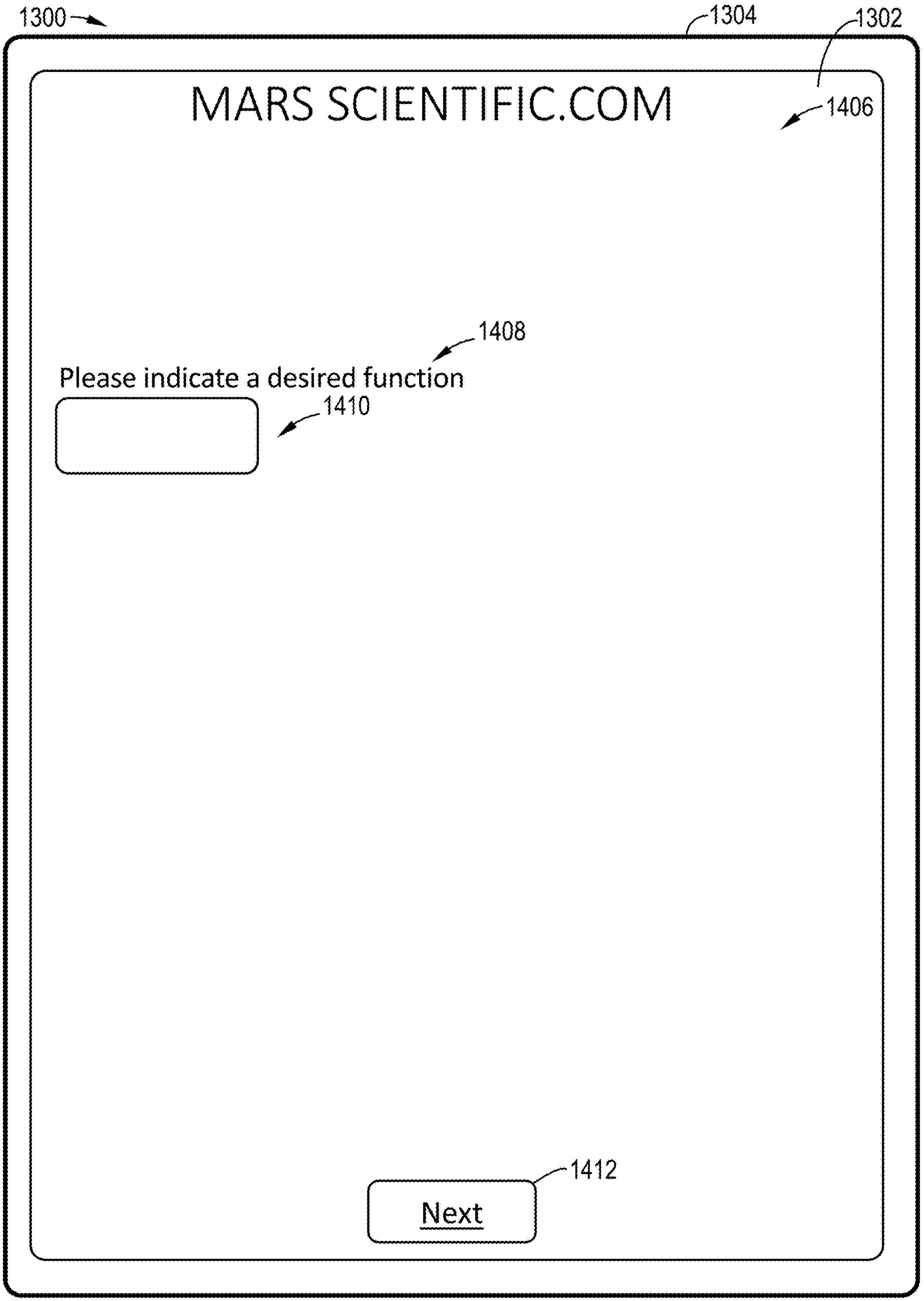
FIG. 14 is a schematic representation of a computing device displaying another view, in accordance with some embodiments.

FIG. 14 shows the computing device 1300 displaying another (e.g., a next) view 1406 that may be generated and/or displayed, in accordance with some embodiments.

Referring to FIG. 14, the view 1406 may include one or more prompts or other instructions 1408 for the user to select a desired function, one or more graphical tools 1410, which may be activated by a user to provide the requested information, and a graphical tool 1412, which may be activated by a user to indicate a desire to proceed or otherwise navigate to another (e.g., next) view in the graphical user interface.

In at least some embodiments, the information provided by the user may indicate: (i) information requested by the user (e.g., information generated in association with one or more of the methods and/or systems disclosed herein, e.g., the image 700 generated by the array processor 130) and/or (ii) configuration and pointing instructions from the user (e.g., a configuration requested by the user for the plurality of fields of view and an imaging target).

Figure 15:
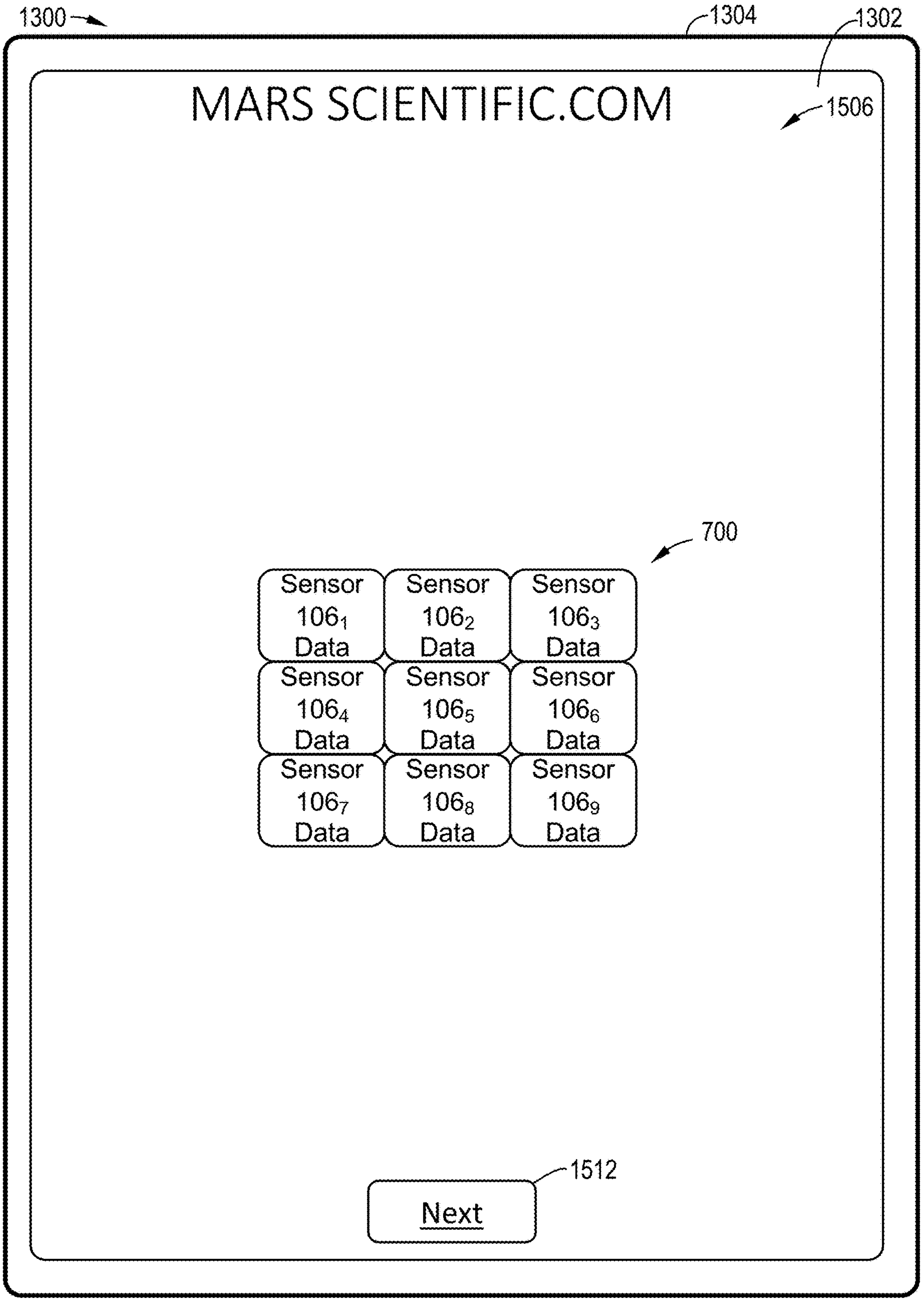
FIG. 15 is a schematic representation of a computing device displaying another view, in accordance with some embodiments.

FIG. 15 shows the computing device 1300 displaying another (e.g., a next) view 1506 that may be generated and/or displayed, in accordance with some embodiments.

Referring to FIG. 15, in accordance with some embodiments, the view 1506 includes graphics or other information that may be generated and/or displayed in response to one or more selections made by the user (in association with the view 1406 (FIG. 14) or otherwise. In at least some embodiments, the graphics or other information may include information generated in association with one or more of the methods and/or systems disclosed herein, e.g., the image 700, 702 and/or any other image generated by the array processor 130.

In at least some embodiments, information generated in association with one or more of the methods and/or systems disclosed herein, e.g., the image generated by the array processor 130, may be streamed (in real time, near real time or otherwise) to computing device 1300 and/or a user, i.e., via the computing device 1300 or any other device(s).

The view 1506 may further include a graphical tool 1512, which may be activated by a user to indicate a desire to proceed or otherwise navigate to another (e.g., next) view in the graphical user interface.

In at least some embodiments, one or more of the views that may be provided by the graphical user may be views generated and/or displayed in performance of one or more methods disclosed herein. The method may further include receiving one or more indications that one or more graphical tools (described herein or otherwise) that have been activated by a user and/or receiving an indication of a selection and/or other requested information that has been provided by the user via activation of one or more graphical tools (described herein or otherwise). The method may further include responding, based at least in part to the one or more indications and/or the received information. In at least some embodiments, responding may comprise responding as described herein.

Some embodiments of the system 100 may be used for surveillance of spacecraft, spacecraft debris, and/or astronomical objects in general. Other embodiments of the system 100 may be used for free space optical communications, and for laser ranging to space objects.

Some embodiments of the system 100 that may be used for surveillance of orbital populations are described above. Some embodiments of the system 100 that may be used for surveillance of orbital populations are further described below. Various embodiments further described below are described with respect to a system having a plurality of telescopes 102 (e.g., 20 telescopes $102_1$-$102_{20}$), each associated with a respective sensor 106 (e.g., sensors $106_1$-$106_{20}$), that is, in effect, a scalable 1.5-meter telescope that actively reconfigures its optics in real time for optimized surveillance of any orbital population, from low earth orbit (LEO) to geosynchronous equatorial orbit (geostationary orbit or GEO). However, any one or more of these embodiments (or feature(s) or method(s) therein) may be used in association with any other embodiments (or feature(s) or method(s) therein) disclosed herein. For that matter, any one or more embodiment (or feature(s) or method(s) therein) may be used in association with any other embodiments (or feature(s) or method(s) therein) disclosed herein.

In at least some embodiments, the system 100 provides the following features (or any sub-combination thereof): (a) optical reconfigurability in real time (or alternatively near-real time or otherwise); (b) optimized configurations for wide, deep, and/or optical fence wide field imaging; (c) optimized sensors for tracking LEO to GEO, cislunar, and interplanetary spacecraft; (d) both wide field and deep surveillance of microsatellites and debris that threaten military or other satellites and/or operational space; (e) beyond state-of-art performance in flexible space domain awareness; (f) an array of 20 independently-actuated sub-apertures (e.g., apertures $104_1$-$104_{20}$ of telescopes $102_1$-$102_{20}$) (of course, other examples and numbers of apertures are comprehended by the invention and disclosure, and all of the present specific dimensions and design details are for illustration of one or more possible embodiments); (g) detection to 18th magnitude in exposures of 1 second, 20th magnitude in exposures of 5 seconds; (h) a mobile 1.5-meter space surveillance system; (i) integrated on a fixed or tracking mount, e.g., a KTM; (j) 110-megapixel sensor with 25 $deg^2$ field of view, deep field high signal-to-noise ratio (SNR) 1.5 m aperture with 1.25 $deg^2$ field of view, leak proof optical fence with 24 degrees wide field of view (110 megapixels); (k) rapid search rate of greater than 22,000 $deg^2$ per hour; (l) astronomy accuracy to less than 0.25 arc-sec; (m) timing to less than 10 milliseconds; (n) real-time GPU based detection and analysis (e.g., using array processor 130), which can be implemented in special purpose hardware, FPGA circuits, etc.; (o) early indication and warnings for objects less than 10 cm; (p) improved space domain awareness and safety of flight at all altitudes; (q) rapid detection and analysis of all new resident space objects; (r) integrated transporter/shelter, no site preparation required; (s) globally deployable by highway, ship or air transport; (t) shock mounted optics that remain assembled during transport; (u) robust field serviceability with replaceable commercial off-the-shelf (COTS) optics and sensors; and/or (v) rapidly scalable and expandable (on additional tracking mounts or otherwise).

In at least some embodiments, the system 100 comprises a reconfigurable array of twenty (rather than nine) co-mounted telescopes 102, e.g., telescopes $102_1$-$102_{20}$, each associated with a respective sensor 106, e.g., sensors $106_1$-$106_{20}$. Each of the telescopes may be a 0.36 m f/2.2 telescope. The telescopes 102 may be mounted on an agile and tactically deployable satellite-tracking mount, such as a KTM satellite-tracking mount. In at least some embodiments, the system 100 may collect data on Low Earth Orbit (LEO) objects at dusk and dawn, then medium earth orbit (MEO), high earth orbit (HEO), and GEO, and then back to LEO objects at dawn. In at least some embodiments, the system 100 provides visibility to less than 200 km altitude orbits at 0° inclination, geostationary longitudes that are not readily visible from other Space Domain Awareness (SDA) sites, and access to low-inclination, highly-eccentric transfer stages whose perigees are not commonly observed. In at least some embodiments, the system thus presents the possibility of disruptive breakthroughs in SDA.

In at least some embodiments, the system 100 has the ability to actively reconfigure its optics in real time for optimized surveillance of any orbital population, from LEO to GEO, cislunar, and interplanetary spacecraft. In at least some embodiments, active distribution of system étendue (a property of light in an optical system which characterizes how “spread out” the light is in area and angle) enables the highest possible sensitivity and search rates, and may produce an exponential increase in the number of targets detected including objects too small to be detected by other SDA assets. In at least some embodiments, the system 100 is a complete space surveillance solution, which also includes an optimized solution for detection of faint and/or transient objects or signals.

Thus, in at least some embodiments, the system 100 combines the light collecting area of a 1.5-meter unobstructed telescope with the ability to selectively mix and isolate twenty 0.36 m f/2.2 sub-apertures (or other sub-apertures). In at least some embodiments, this delivers a large effective aperture while preserving the optically fast and wide field of view required for detection of faint and/or fast-moving objects. In at least some embodiments, the system 100 can be reconfigured as a 110-megapixel sensor with a 25 $deg^2$ field of view, or a 1.5-meter aperture f/0.5 high-SNR sensor with a 1.25 $deg^2$ field, or as a 24° wide, 110-megapixel leak-proof optical fence. It is again noted that the present examples, dimensions, and design details are only presented for the sake of illustration, and those skilled in the art will appreciate the numerous other equivalent and alternative examples that would fall within the present scope and which are hereby also comprehended by the invention.

In at least some embodiments, performance of the system 100 derives, at least in part, from configurable electro-mechanically actuated arrays, large total light collecting area, fast optics, low-noise fast-framing sensors, advanced image processing methods, and a versatile satellite tracking mount on which they are integrated. In at least some embodiments, the system 100 is scalable and can be expanded (with or without limit) by simply deploying one, two or more additional systems that are similar to and/or the same as the system 100, at the same or operatively connected sites. For example, in at least some embodiments, a system or assembly having three systems 100 (a first system 100, a second system 100 and a third system 100) can provide an effective aperture of 2.6 meters, which is comparable to that of many of the current larger telescopes once central obscuration and transmission are accounted for.

In at least some embodiments, the search rate of the system 100 depends on the optical configuration. In at least some embodiments, in a wide-field mode, the system 100 is a 110-megapixel array delivering a 25 $deg^2$ field of view. Although search rate will change with exposure, with three 0.5 second exposures, with 0.02 second readout, combined with the KTM's step and settle of <3 seconds produces a wide field survey rate of ~20,000 square degrees per hour with the arrays extended, and 1,000 square degrees per hour in each with the arrays concentrated.

In an aspect the concentrated arrays comprise those where views from some or all telescopes collect light from the same part of the sky, e.g., a small field of view, but relatively large quantity of light collected, and the sensor data combined to make the final image (e.g., image data) or data. The sensor data may be combined in real time in the computer memory for speed and saving hard drive space—or combined at a later time.

In at least some embodiments, different exposures and different array configurations will produce different survey rates as a function of sensitivity which can be optimized for scanning a desired altitude or type of target. The variables determining search rate and limiting magnitude include effective aperture, focal ratio, spatial sampling, read noise, quantum efficiency (QE) of the sensor, time for the telescope step and settle, and exposure time to suit the desired target population. In at least some embodiments, estimates of search rates for any desired observation can be readily performed from accepted radiometric principals by those skilled in the art.

In at least some embodiments, the system 100 may be used to generate empirical data useful in determining optimal combinations of aperture geometry, slew velocities, and search strategies. In at least some embodiments, the resulting datasets enable the development of baseline and advanced operational modes and assists in the design of next-generation distributed aperture approaches to space domain awareness.

In at least some embodiments, the mount 121 comprises a KTM. In at least some embodiments, the system 100 may employ the KTM to slew its optical array at jitter-free rates from sub-arcsecond up to 10 degrees/second to survey specific orbital altitudes and inclinations. In at least some embodiments, the system 100 performs the above increasing SNR and limiting magnitude, and reducing minimum detectable object size. To avoid the singularity at the zenith, the KTM can smoothly ramp up to 60 deg/sec at an acceleration of 60 deg/sect during tracking as needed.

It is noted that the specific examples, parameters, and/or commercial components recited herein are merely illustrative, and the present invention can be implemented with any reasonable or equivalent substitutes, additions or omissions to the stated illustrative examples. Therefore, any particular embodiments or preferred configurations given herein are merely for the sake of example and not by way of limitation.

In at least some embodiments, the processor provides telescope pointing, array configuration control, camera control, autonomous calibration, object detection and characterization, object tracking, astrometry, and predictive logic for reacquisition of objects.

In at least some embodiments, the processor executes instructions that result in performance of the above.

In at least some embodiments, the system 100 produces large amounts of data that are supported by implementing powerful graphics processing via (GPU)-based and/or FPGA-based solutions or other custom processor solutions for parallel operations in faint object detection, integration streak detection (Radon, Hough), and image processing in near real time.

In at least some embodiments, the system 100 includes multiple processors that perform image analysis in parallel to enable optimized (or at least more optimized) near-real-time detection of objects, and immediate (or at least more immediate) reacquisition and characterization during the same pass.

In at least some embodiments, development of the system 100 may proceed as follows. The plurality of telescopes, e.g., telescopes $102_1$-$102_{20}$, and associated sensors, e.g., sensors $106_1$-$106_{20}$, are installed in the associated housings, e.g., housings $110_1$-$110_{20}$, and the housings are installed in the individually-adjustable telescope supports, e.g., individually-adjustable telescope supports $126_1$-$126_{20}$, which are then assembled onto the mount 121. Thereafter, relative positioning (sometimes referred to herein as alignment) and calibration may be performed. After the optical systems are calibrated and relatively positioned (sometimes referred to herein as aligned), end-to-end testing may be performed. In at least some embodiments, end-to-end testing may comprise telescope pointing/scanning, object identification and tracking. In at least some embodiments, it may be desirable to perform end-to-end testing at a location that provides visibility to <200 km altitude orbits at 0° inclination, geostationary longitudes that are not readily visible from other SDA sites, and access to low inclination highly-eccentric transfer stages whose perigees are not commonly observed. In at least some embodiments, laminar oceanic airflow and good seeing conditions are desirable.

With respect to atmospheric turbulence, commonly referred to as astronomical "seeing", in at least some embodiments, the system 100 has additional advantages in that the use of a plurality of telescopes (with smaller apertures) rather than a single monolithic telescope (with one larger aperture) provides statistically better astronomical "seeing" for each of the small apertures, which translates to a higher limiting magnitude and lower satellite size detection limit compared to the equivalent large single telescope.

In at least some embodiments, the system 100 provides each of the following features: a reconfigurable aperture array, optically fast and wide imaging systems, tactical deployment and operation, use of any custom-made or commercial off-the-shelf (COTS) optics and sensors, rapid expansion and scalability, and near-real-time object detection through increased signal to noise ratio and intelligent search methods. In some embodiments, system(s) 100 can be used as a single site or bistatic sites for laser ranging and orbit determination. In some embodiments, system(s) 100 can be used for Light Detection and Ranging (LIDAR) imaging.

In at least some embodiments, the system 100 delivers an ètendue of 2.3 $m^2deg^2$, the distribution of which can be geometrically reconfigured as needed in real-time or near real-time. This is several times greater than the ètendue of common monolithic meter-class telescopes which often also suffer from low throughput.

In at least some embodiments, the system 100 includes a dual-axle L-3 trailer, which in at least some embodiments, makes the system 100 a mobile 1.5-m satellite tracking system that can be tactically deployed via road, sea, or air without need for payload disassembly.

In at least some embodiments, the use of multiple identical elements enables the robust performance required for critical SDA support. In at least some embodiments, any component failure is mitigated quickly and inexpensively through the use of field-serviceable, replaceable items such as sensors, computers, or optics. Unlike many other SDA assets, in at least some embodiments, the system 100 employs telescopes 102, e.g., telescopes $\mathbf{102}_1$-$\mathbf{102}_{20}$, in its optical array that are sensor agnostic, and retain the ability to receive new or upgraded telescopes or sensors without modification.

In at least some embodiments, the system 100 is rapidly expandable so as to comprise two or more systems 100 which may be separated by multiple kilometers to enable single-pass, real-time orbit determination via parallax. Alternatively, or additionally, in at least some embodiments, two or more identical systems 100 at a single site would increase the light collecting area to that of a multi-meter optically fast telescope with a field of view in excess of 50 $deg^2$ and 220 megapixels per image.

In at least some embodiments, a system may be expanded so as to comprise two or more systems 100, with all two or more systems co-located at one site, separated by multiple kilometers, or widely separated (e.g., globally deployed). Data including, but not limited to, photometry, astrometry, light curves, and spectra of detected targets can be acquired and generated, with one or more of the sub-apertures of one or more of the systems 100 enabling additional channels of optical characterization.

In at least some embodiments, the use of multiple identical elements in system 100 provides robust performance via compartmentalization of individual component failures.

In at least some embodiments, the system 100 provides efficient detection, discrimination, tracking, and measurement of faint targets rapidly moving against a comparatively bright background. The technical approach taken in at least some embodiments is detailed below.

In at least some embodiments, the system 100 is capable of producing enormous volumes of data due to its high frame rate and duty cycle and a data management system is provided in order to accept, store, distribute, and communicate the raw and processed data. Secondary data may include location, weather parameters, time tags, and pointing data from the KTM. In at least some embodiments, the information is parsed and accepted by the data handling system. In at least some embodiments, the raw data may be stored uncompressed and unaltered for subsequent processing. In at least some embodiments, the data may be distributed for storage or immediate processing (e.g., object detection), with real-time analyses enabled by parallel implementation on GPUs, (FPGA)-based solutions, or custom processors. In at least some embodiments, relevant reduced data may be stored and/or communicated to the network architecture 1200 and/or one more users (user devices 1204) in the network architecture 1200.

In at least some embodiments, the processor 810, 130 may execute control software that ensures proper actuation of the independently-pointed optics and focus of each telescope. In at least some embodiments, the actuation and focus may be controlled through feedback from an autonomous calibration block, which may optimize imaging under changing conditions (e.g., optical and thermal changes). In some embodiments, initial calibration may be completed using traditional approaches such as checkerboard patterns and standard test images. In some embodiments, during operation, it may be desirable to update initial calibrations with principal point offsets and any bias values measured before or after data collection. In at least some embodiments, this may be completed by standard astrometric reduction which uses flat frames, dark frames, bias frames, and sky images with known star positions on the image plane. In at least some embodiments, a database of hot, cold, and dead pixels may be identified, and dark frames, bias frames, and flat field images may be stored for processing purposes.

In at least some embodiments, technology advancements include: flexible optical aperture design, software for autonomous configuration control, distributed aperture strategies for optimal data collection, and/or image processing methods for flexible aperture data reduction. In at least some embodiments, the system 100 may use an agile GPU-based or FPGA-based or other data reduction system that may be applicable to other programs that produce large amounts of data, yet require real-time imaging and analysis. In at least some embodiments, empirical data may be used in determining the most successful combinations of aperture geometry, comb/scan velocities, and search strategies for autonomous detection of resident space objects of all types.

In at least some embodiments, the processing (which may include software) may be broken into the functional categories listed below.

In at least some embodiments, autonomous calibration is a method of health monitoring as well as a way to ensure the fidelity of the images and estimates produced by the system. In some embodiments, as environmental conditions change (e.g., weather, thermal, location, local winds), the optical system of the system 100 may be periodically recalibrated. Well-characterized calibration methods have been developed and demonstrated on telescopes and star trackers. In at least some embodiments, one primary function of calibration is to use on-frame known stellar fiducials to produce corrected coordinates of stars or objects from their apparent positions in the image. In at least some embodiments, the system 100 may include centroiding methods that in at least some embodiments provide accuracy to $1/20^{th}$ of a pixel with sufficient SNR. In at least some embodiments, the system 100 may have an image scale of 1.7-arcseconds per pixel, resulting in sub-arcsecond centroids suitable to high-resolution astrometry. In at least some embodiments, multiple images are taken over a period of time, and characterization of potential high-order systematic optical distortions and support flexure are achieved. In at least some embodiments, as additional data is collected and larger numbers of images are processed, the system 100 produces an increasingly accurate refinement of any nonlinearities; and image processing accuracy improves with time. In at least some embodiments, the accuracy of the tracking mount, pointing and GPS location is determined and used in the autonomous calibration.

In at least some embodiments, the system 100 may continually estimate and/or update sensor biases as images are collected. As stated herein, in at least some embodiments, the image processing may include dark field and/or flat field reduction, which in at least some embodiments, may be taken before and after data collection as part of the calibration.

In at least some embodiments, dead, hot, and cold pixels of each camera may be identified and data indicative thereof may be logged or otherwise stored, e.g. in a database. During image processing, these pixels may be ignored in at least some embodiments unless they overlap with an object of interest, in which case accepted methods of estimating the pixel value may be employed. As used herein, dead pixels may be identified as those pixels with constant (usually zero) intensity reading over multiple images. As used herein, hot pixels may be identified as those pixels that generally are activated and have maximum intensity over multiple images. These pixel types may occur as time goes on due to weather elements, mechanical/electrical failure, and typical usage. In at least some embodiments, streaks due to birds, airplanes, or cosmic ray events will be either ignored or reported as such.

In at least some embodiments, vignetting of the optical system and of each camera may be identified and data indicative thereof may be logged or otherwise stored, e.g. in a database. During image processing, these data may be ignored in at least some embodiments or accepted methods of estimating the unvignetted pixel values may be employed. Changes in vignetting may occur as time goes on due to changes regarding the sensor or mechanical/optical properties of the optical system. In at least some embodiments, vignetting will be either ignored or reported as such.

In at least some embodiments, image processing may begin when the images are captured by the plurality of sensors, e.g., sensors $106_1$-$106_{20}$, which as stated above, may each comprise a CMOS or SPAD or EMCCD sensor. In at least some embodiments, as the data is coming from the sensor into local memory, a run length encode (RLE) method may be used to scan the entire image one or more time in order to find clusters of adjacent pixels which lie in the same image row, and to then merge any clusters that are adjacent to one another. After no adjacent clusters remain to be merged, the blocks of adjacent pixels may be isolated. A centroiding process may then be performed. In at least some embodiments, the use of the RLE process may speed up the centroiding process by a minimum of a factor of 3 as it avoids reading an entire image into memory. Additionally, in at least some embodiments, RLE is capable of identifying complex point spread functions generated by extended objects or complex reflection patterns.

The processing may be performed in or proximal to suitable hardware, memory, etc. and in or near real time. But processing can also be done by loading previously-encoded images at a subsequent time. This permits in some instances the processing of relatively large amounts of data without needing to save all of the data in computing resources so as to avoid bottle-necking or limiting the system and method by accumulation of large quantities of data in limited-resource locations/steps. The local memory in reference can include digital storage memory unit(s) disposed and operated to pre-process information at a computing resource in or proximal to each telescope (associated therewith).

In at least some embodiments, processing may further include identifying a center of any bright shape. Centroiding may be performed after the center of a bright shape has been identified. In this regard, the typical center-of-mass (COM) calculation has been shown to produce better than $1/20^{th}$ pixel resolution. While other methods exist, they are generally much more mathematically complex and therefore require more processing time and power, while yielding marginal improvements at best. Because this process is mathematically simpler, in at least some embodiments, centroids may be distributed to GPU or FPGA or custom processor nodes for fast processing.

In at least some embodiments, if the system 100 has not moved significantly between a set of images, predictive centroiding may be employed to estimate where the known centroids from a previous image will appear in the current image. In at least some embodiments, this may be accomplished by propagating the star positions as needed in the image plane. In at least some embodiments, this method may save time and computational resources. In at least some embodiments, objects that do not appear where predicted have likely moved with different velocity than the stars, and therefore merit further investigation.

In at least some embodiments, after the centroids in an image are identified, the stars will be identified using the fastest and most accurate methods available. Pre-processing the star catalog to a specified format, the k-vector, allows for a "search-less" approach to database inquiry. The Pyramid star identification method is among the fastest and most accurate methods published to date. Given 4 stars in an image (or set of images), the probability of a false positive match is $10^{-12}$. Pyramid is also extremely robust for non-stellar objects in the image. Identifying the stars in the image allows: 1) the known stars to be removed from the image (e.g., based on a star catalog), leaving only objects of interest, and 2) the location and orientation of the sensor to be determined to arcsecond precision which in some embodiments is necessary for orbit determination. ESOQ-2 has been shown to be fast, robust, and accurate. It is an industry standard method used in star trackers. The astrometric accuracy of the Tycho-2 star catalog is <20 milliarcseconds for reference stars of the magnitude at least some embodiments of the system 100 would use.

In at least some embodiments, after the known stars are removed from an image, the remaining objects become objects of interest. In some embodiments, two or more image processing methods may be combined based on the mode of operation. For example, Fourier transform filtering may work better than Hough transforms when in certain optical modes. Point Spread Function fitting has been shown to give the most accurate trail parameter estimates. Image deconvolution has been shown to effectively rectify atmospheric and systemic distortions.

In at least some embodiments, multiple image processing techniques can be applied to the same image in series or in parallel, and the output combined. In at least some embodiments, this enables the system 100 to perform flexible image processing methods in real time that take advantage of multiple GPU, FPGA, and/or custom processor implementations.

In at least some embodiments, tracking multiple objects through sequences of images is best performed using Bezier curves. These simple and computationally efficient functions are robust to a wide range of dynamics (from the object as well as from the KTM). When combined with predictive centroiding, Bezier curves help correlate objects across multiple images.

In at least some embodiments, the output of the object detection method is a unit vector from the system 100 to the object. In at least some embodiments, this may be directly used to estimate the orbit of the object or to produce a possible match to an object in the space catalog.

In at least some embodiments, an observation may result in a target appearing as a streak on the sensor due either to its angular speed or the purposeful motion of the tracking mount, or a combination of both. The following two methods may be employed to determine the end points of a detected streak. First, assuming the object is a point source, a half-circle is best fit to both ends of the streak. Then the average of these two fiducials is used to determine the beginning and end centroids. This method has been shown to work especially well for short streaks. The second method employs Bezier curves, which generates a path in the image plane of the centroid through the entire streak. This method has been shown to work well for longer streaks or streaks where the object had non-uniform velocity during the streak. The system 100 may employ powerful GPU-based or FPGA-based solutions to provide optimized streak detections.

In at least some embodiments, the system 100 includes several different strategic approaches to optimize detection of resident space objects. Each approach offers distinct advantages in one or more aspect of detection, and one may offer superior performance over another depending on a target's size, albedo, phase angle, inclination, and/or angular speed.

In at least some embodiments, the tracking mount of system 100 initially points and maintains the system 100 on a desired fixed sky location with respect either to the star background or to a selected azimuth and elevation. Objects passing through the telescope's field of view while in this "staring mode" may be detected either as a streak or as a series of points depending on the gating of the sensors. This approach can be useful when searching for unknown objects. Detections of objects as streaks can be more challenging due to the reduced SNR of satellite streaks compared to actively-tracked satellites which may appear as condensed points on the sensors. When this occurs, powerful GPU-based or FPGA-based solutions may be employed to provide optimized streak detections and analyses.

In at least some embodiments, the tracking mount of system 100 includes a Tracking Mode (TM) in which the initial pointing of the tracking mount is fixed with respect either to the star background or to a selected azimuth and elevation. When an object passes through the fields of view 105 of telescopes 102, the system calculates the angular speed and direction of the object and can then use this data to actively track the object. In at least some embodiments, tracking can keep a moving object-of-interest stationary in the field(s) of view or slew to stationary positions ahead of the satellite and allow the object to repeatedly streak through the field(s) of view, or a blend of the two approaches.

In at least some embodiments, the tracking mount of system 100 may be commanded to strategically scan the fields of view 105 through space at angular velocities matching specific orbital altitudes and inclinations. In at least some embodiments, this approach increases SNR and limiting magnitude, and reduces minimum detectable object size to <10 cm at an altitude of 1,000 km. Specific orbits can be scanned by cycling the tracking rates and sensors through pre-computed matrices of possible angular velocities. When targets are detected on sensors 106, the system may calculate the angular speed and direction of the target and may then use this velocity to actively track the object.

In at least some embodiments, the system 100 includes a Velocity Profile Mode in which the system 100 may slew at nonlinear speeds generated by specific mathematical functions designed to momentarily peak-up SNR for detection of faint targets. In at least some embodiments, VPM follows a parabolic, spiral, circular, and/or other profile(s) in search of the most elusive targets. By strategically choosing certain nonlinear velocity curves, it can be shown that at some point a given moving across the sky must exhibit a minimum relative speed as imaged on sensors 106, and may appear stationary or nearly so in fields of view 105, if only for a short period of time. In at least some embodiments, the system may operate in VPM across a 25 square degree field of view. In at least some embodiments, the system 100 includes sensors 106, e.g., e.g., sensors $106_1$-$106_{20}$ of telescopes $102_1$-$102_{20}$, that collectively provide 110 megapixels of sensors read out at 50 FPS across a 25 square degree field of view, which presents the possibility of a disruptive breakthrough in the detection of faint, previously unseen targets.

In order to view an object more than once per pass, at least some embodiments of the system 100 may include re-acquisition methods. For short term re-acquisition, methods similar to predictive centroiding may be used where propagation across short time steps will occur in the image plane. This allows the telescope to move if the object is near the edge of the image or passes out of the field of view. For longer time re-acquisition, three separate images may be acquired and used to allow the orbit to be estimated and high-fidelity propagation models on the GPU to efficiently generate future coordinates. In some embodiments, the system 100 may compare an object to correlated targets in the space catalog.

In at least some embodiments, the system 100 may include a tracking mount, which includes precision motion controls, large payload capacity, mechanical stiffness, operational reliability, and the ability to support a wide range of configurations and test conditions. In at least some embodiments, the system 100 may be supported on a fixed mount, staring at the same area of sky for extended periods of time.

In at least some embodiments, the system 100 delivers a total étendue of 2.3 $m^2deg^2$, collected from twenty independently-actuated 0.36 m f/2.2 apertures, e.g., apertures $104_1$-$104_{20}$ of telescopes $102_1$-$102_{20}$. Thus, in at least some embodiments, the system 100 combines the aperture of a 1.5-meter telescope with the ability to distribute étendue for real-time trades between SNR and field of view. This flexibility enables the system 100 to optimize itself for both wide and deep uncued detection resident space objects. A different number of telescopes 102 can be provided in other embodiments.

In at least some embodiments, the system 100 has a high-SNR configuration that is achieved by operating the system 100 as a 1.5-meter aperture with a 782 mm focal length, and 1.25 $deg^2$ field of view. This produces an effective focal ratio of ~f/0.5, enabling the short exposures required for <10 cm RSO detection due to the background-limited process of imaging fast-moving objects.

In at least some embodiments, the system 100 has a wide field of view configuration that provides a 110-megapixel 25 $deg^2$ field of view at f/2.2, with an enhanced probability of uncued detection when combined with Orbit Scan Mode and Velocity Profile Mode described herein.

In at least some embodiments, the system 100 can also be configured as a 24-degree wide, 110-megapixel f/2.2 leak-proof optical fence sampled at 1.7-arcseconds/pixel. The configurable nature of at least some embodiments of the system 100 enables scans optimized for a wide range of survey rates, orbital altitudes, and satellite populations.

At least some embodiments of the system 100 use optically fast telescopes, e.g., telescopes $102_1$-$102_{20}$, that preserve the highest limiting magnitude (and smallest detection size limit) possible from the effective 1.5-meter aperture. In at least some embodiments, this results from the smaller apertures in system 100 being a better match to the atmospheric coherence scale length ($r_0$), resulting in smaller point spread functions in the focal plane. In at least some embodiments, the system 100 uses telescopes, e.g., telescopes $102_1$-$102_{20}$ that are identical to one another, which reduce the risk and impact of failure; any component failure is mitigated quickly and inexpensively through the use of field-serviceable, replaceable optics and sensors.

In at least some embodiments, optimized detection of moving objects requires short exposures, often 50 milliseconds or less depending on the object's apparent angular speed and the amount of background signal. In at least some embodiments, the optimal sensor is one with high sensitivity, low noise, wide dynamic range, and the ability to take large numbers of short exposures at high duty cycle. In at least some embodiments, the sensors 106, e.g., sensors $106_1$-$106_9$ and/or sensors $106_1$-$106_{20}$, may comprise a charge coupled device (CCD), an EMCCD, a CMOS sensor, and/or another sensor.

In at least some embodiments, the sensors 106, e.g., sensors $106_1$-$106_9$ and/or sensors $106_1$-$106_{20}$, may comprise SPAD sensors or other photon counting technologies for use in LIDAR and free space communications.

In at least some embodiments, assembly of the system 100 may use a KTM (or other) mount as the base support for the assembly of the system 100.

FIG. 16 is a flowchart 1600 of a method in accordance with some embodiments. In at least some embodiments, the method (or one or more portion(s) thereof) may be performed by the systems described herein, including system 100 and/or architecture 1200.

In at least some embodiments, one or more portions of the method may be used without one or more other portions of the method. For that matter, in at least some embodiments, one or more portions of any method disclosed herein may be used without one or more other portions of such method.

In at least some embodiments, the method (or one or more portion(s) thereof) may be performed using one or more portions of one or more other methods disclosed herein. For that matter, in at least some embodiments, any method (or one or more portions thereof) disclosed herein may be performed using one or more portions of one or more other methods disclosed herein.

Referring now to FIG. 16, at 1602, the method may include adjustably supporting each one of a plurality of telescopes 102 with a respective individually-adjustable telescope support 126 that is adjustable to change the respective positioning of the one of the plurality of telescopes 102 and the respective fields of view 105 of the telescopes 102.

At 1604, the method may further include configuring each of a plurality of sensors 106 to receive and sample light from a respective one of the plurality of telescopes 102 and to output data based at least in part thereon.

At 1606, the method may further include receiving, by an array processor 130, the data output by the plurality of sensors 106.

At 1608, the method may further include generating, by the array processor 130, an image based at least in part on the data output by the plurality of sensors 106.

Figure 17:
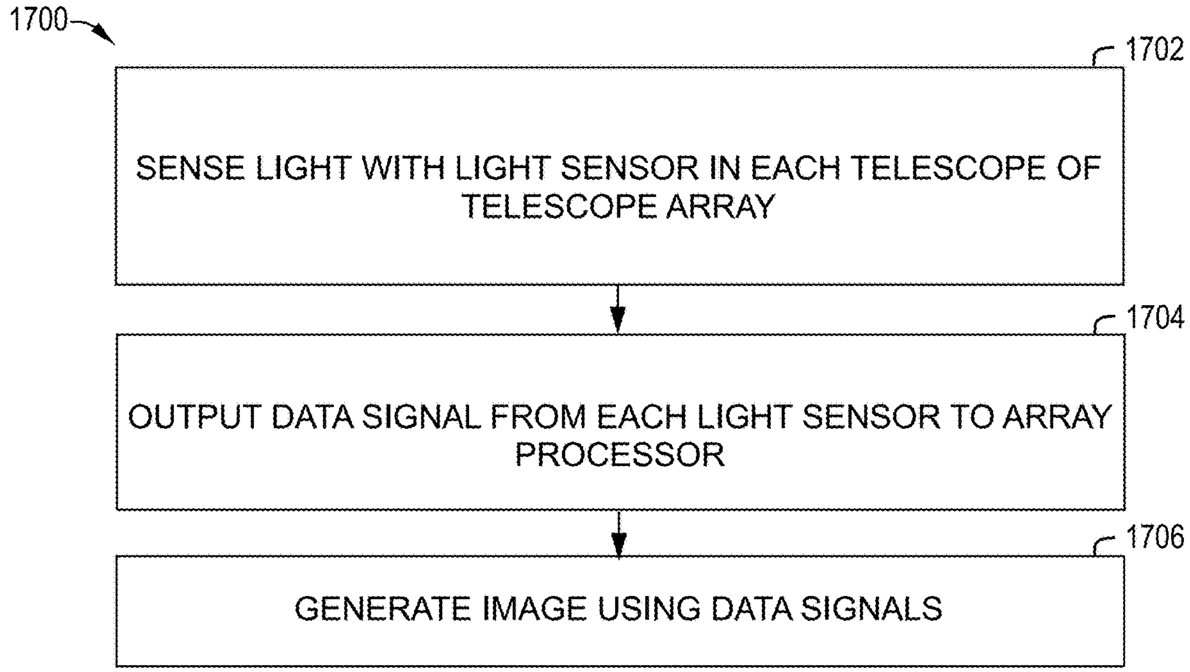
FIG. 17 is a flowchart of a method for viewing celestial objects according to one or more embodiments.

FIG. 17 is a flowchart 1700 of a method for viewing celestial objects according to one or more embodiments. The method can be performed with any of the apparatus, systems, and/or architectures disclosed herein.

In step 1702, light is sensed and/or sampled with a light sensor (e.g., sensor 106) in or coupled to (e.g., optically and/or electrically coupled to) each telescope (e.g., telescope 102) in the telescope array 101.

In step 1704, a data signal is output from each light sensor. The data signal represents the light sensed and/or sampled with the light sensor. For example, the data signal can represent the relative position on the sensor, astrometric position, intensity, color, polarization state, and/or other aspect of the light sensed and/or sampled with the light sensor. In some embodiments, the data signal can include or can represent pixels of light data. Each pixel can have a relative location or relative position that corresponds to a position or location in the field of view of the telescope. In addition, each pixel can have a light intensity value that corresponds to the measured intensity of the light at the corresponding position or location in the field of view of the telescope. The data signal output by each light sensor is sent to an array processor (e.g., array processor 130).

In step 1706, the array processor generates an image using the data signals received from the light sensors. The array processor can generate the image by merging some of the received data signals (e.g., using the RLE method or other technique as discussed herein. The array processor can merge the data signals based, at least in part, on the relative positioning of each telescope, which determines each telescope's field of view. In some embodiments, the array processor can receive an operating mode input signal that represents an operating mode of the telescope array. The operating mode can correspond to a relative positioning of each telescope in the telescope array.

Figure 2H:
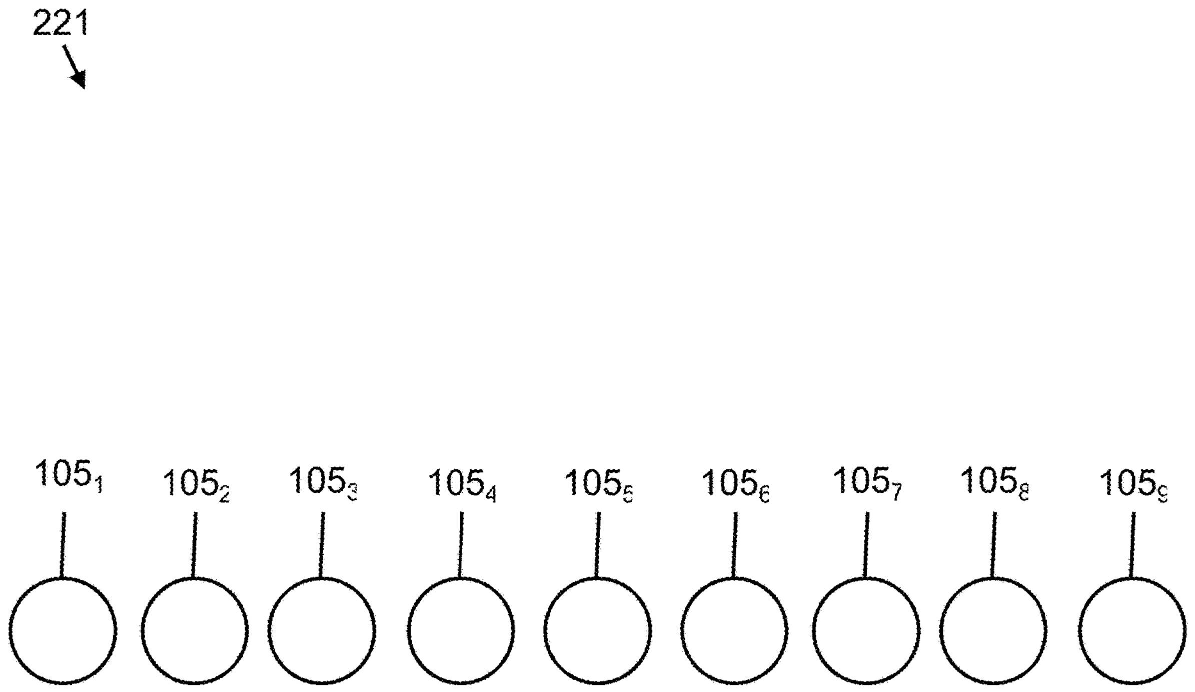
FIG. 2H is a schematic representation showing another possible relative positioning of a plurality of fields of view, in accordance with some embodiments.
Figure 2I:
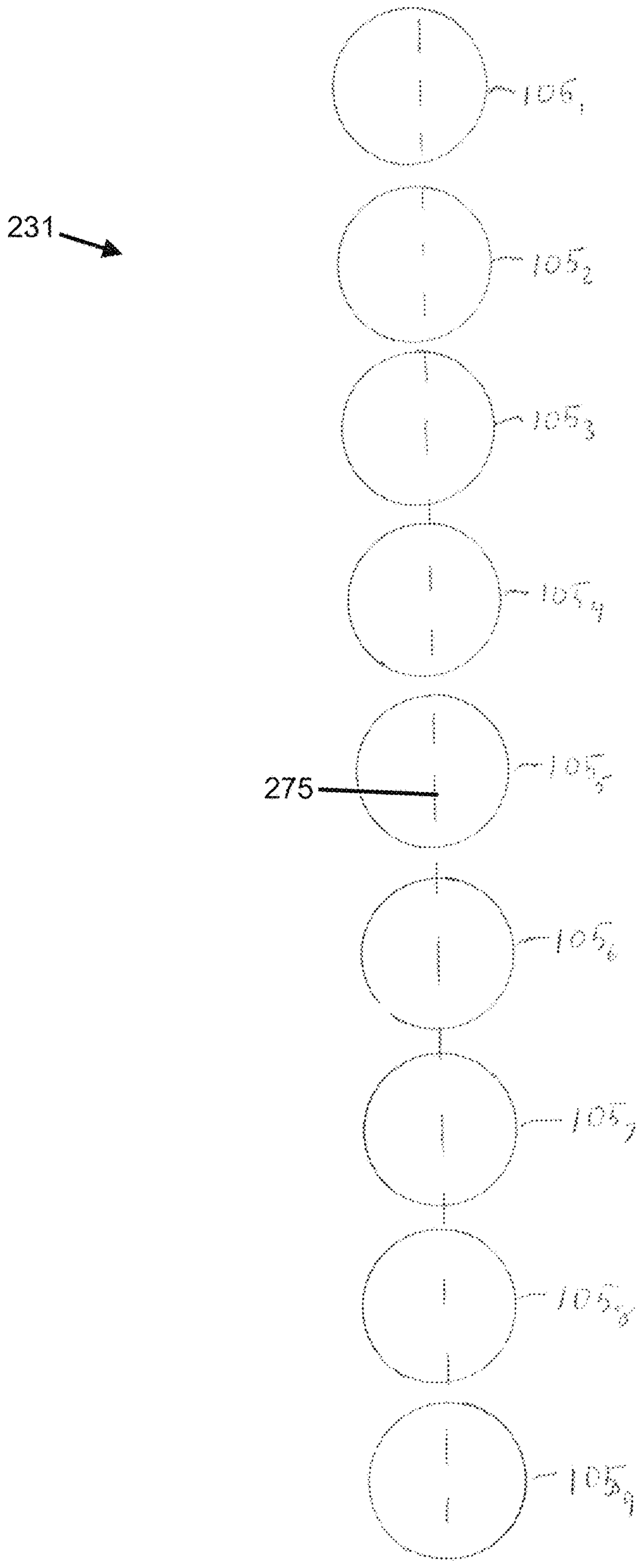
FIG. 2I is a schematic representation showing another possible relative positioning of a plurality of fields of view, in accordance with some embodiments.
Figure 2J:
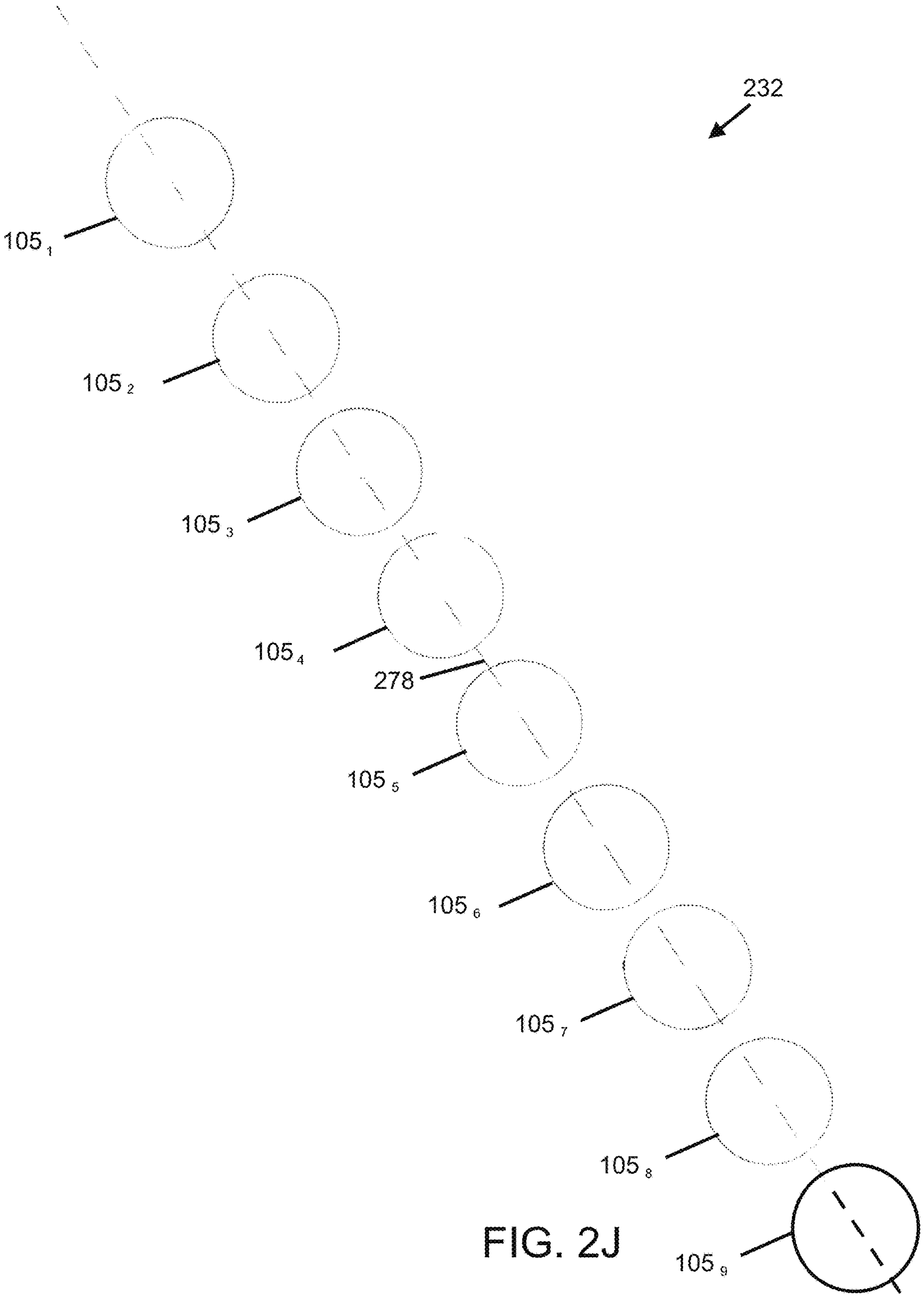
FIG. 2J is a schematic representation showing another possible relative positioning of a plurality of fields of view, in accordance with some embodiments.
Figure 2K:
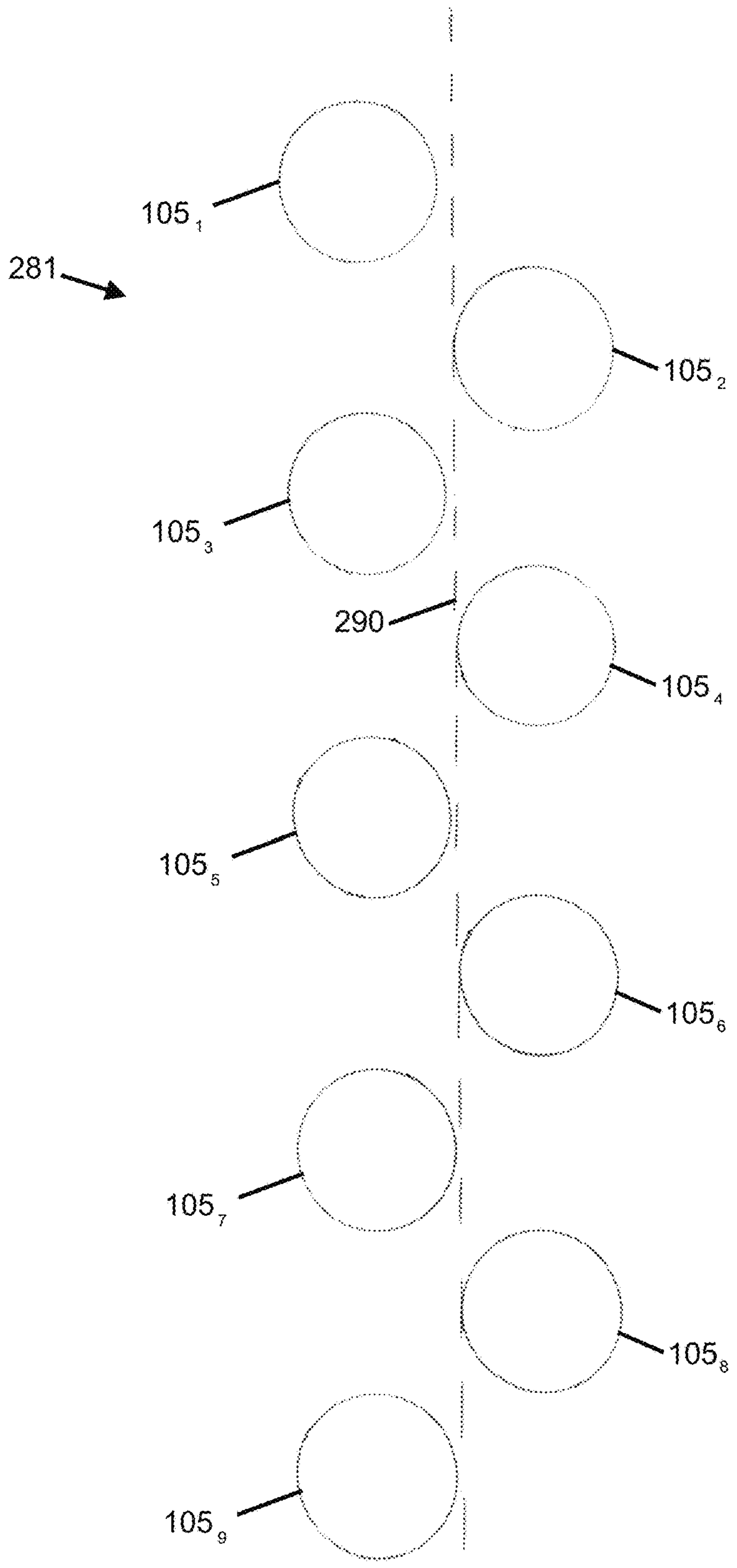
FIG. 2K is a schematic representation showing another possible relative positioning of a plurality of fields of view, in accordance with some embodiments.
Figure 2L:
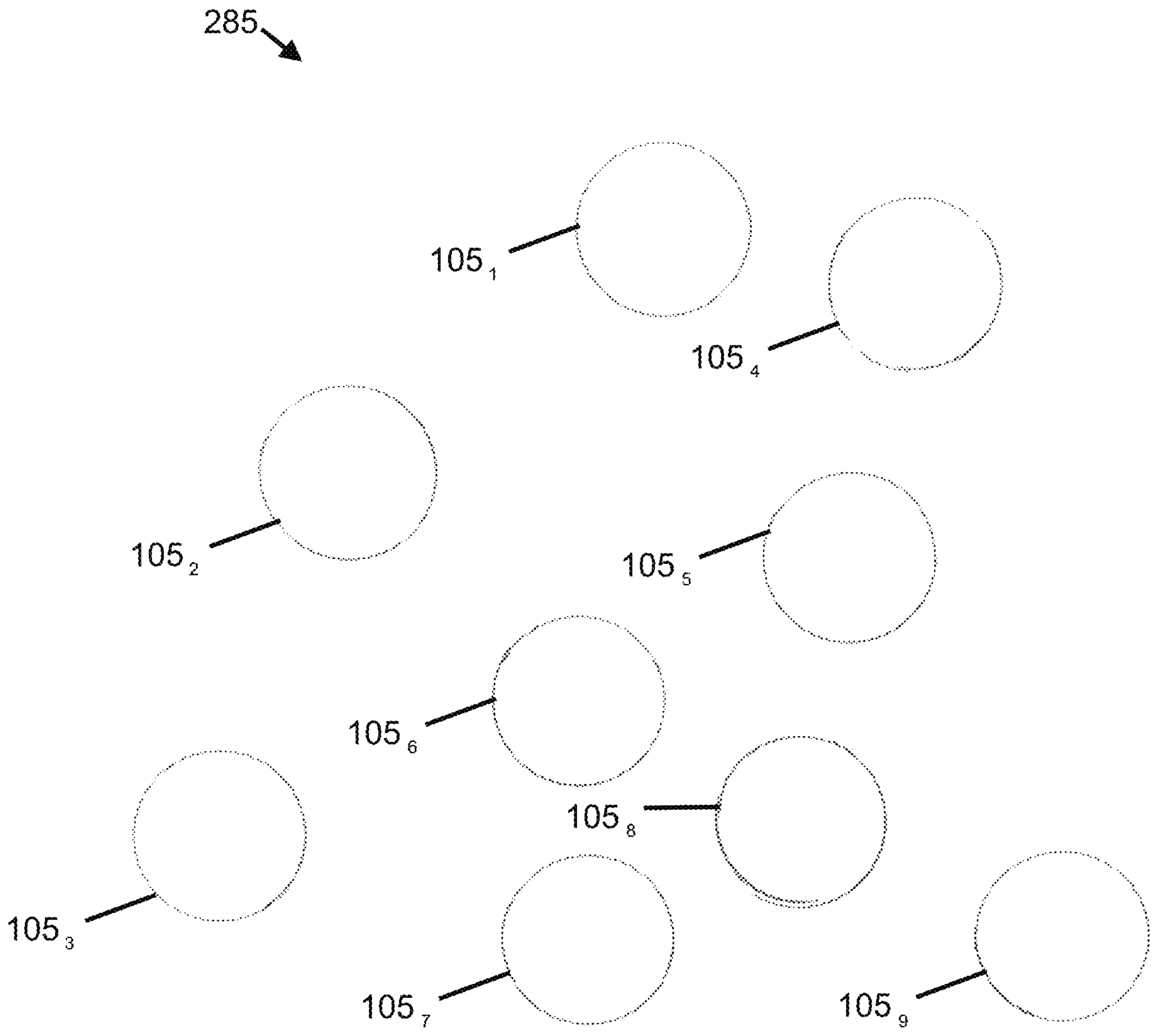
FIG. 2L is a schematic representation showing another possible relative positioning of a plurality of fields of view, in accordance with some embodiments.

In a first operating mode, the telescopes can be arranged in a grid or array having a plurality of columns and rows and there is a minority of overlap or no overlap between neighboring fields of view (e.g., as illustrated in representation 200), which can correspond to an expanded state of the telescope array. In a second operating mode, the telescopes can be arranged in the same grid or array in the first operating mode but there is a majority of overlap or substantively complete overlap between neighboring fields of view (e.g., as illustrated in representation 210), which can correspond to a contracted state of the telescope array. In a third operating mode, the telescopes can be arranged in a column or row with partial overlap between neighboring fields of view (e.g., as illustrated in representation 220 or 230) or no overlap between neighboring fields of view (e.g., as illustrated in representations 221 and 231 in FIGS. 2H and 2I, respectively). In a fourth operating mode, the telescopes can be arranged so that the respective fields of view are laterally offset with respect to a central axis and there is a partial overlap between the neighboring fields of view (e.g., as illustrated in representation 280) or no overlap between neighboring fields of view (e.g., as illustrated in representation 281) in FIG. 2K. In a fifth operating mode, the telescopes can be arranged so that there is no overlap between the neighboring fields of view and the fields of view are not oriented along a central axis, for example as illustrated in representation 285 in FIG. 2L. There can be a majority or a minority of overlap between neighboring fields of view in the third and fourth operating modes.

The telescopes can be adjusted manually or automatically to achieve each operating mode. To automatically adjust the telescopes, respective individually-adjustable telescope supports are adjusted by activating one or more actuators (or other devices), which can provide relative movement for the individually-adjustable telescope supports (e.g., to clamps) to set the relative positioning of each telescope, which can correspond to the desired operating mode of the telescope array. The actuators (or other devices) can be automatically activated by sending control signals from a controller to the actuators (or other devices). The controller can generate the control signals in response to manual commands (e.g., from a user via a computer terminal) and/or in response to an operating mode input signal that represents the desired operating mode (e.g., first operating mode, second operating mode, third operating mode, fourth operation mode, etc.) of the telescope array.

Figure 18:
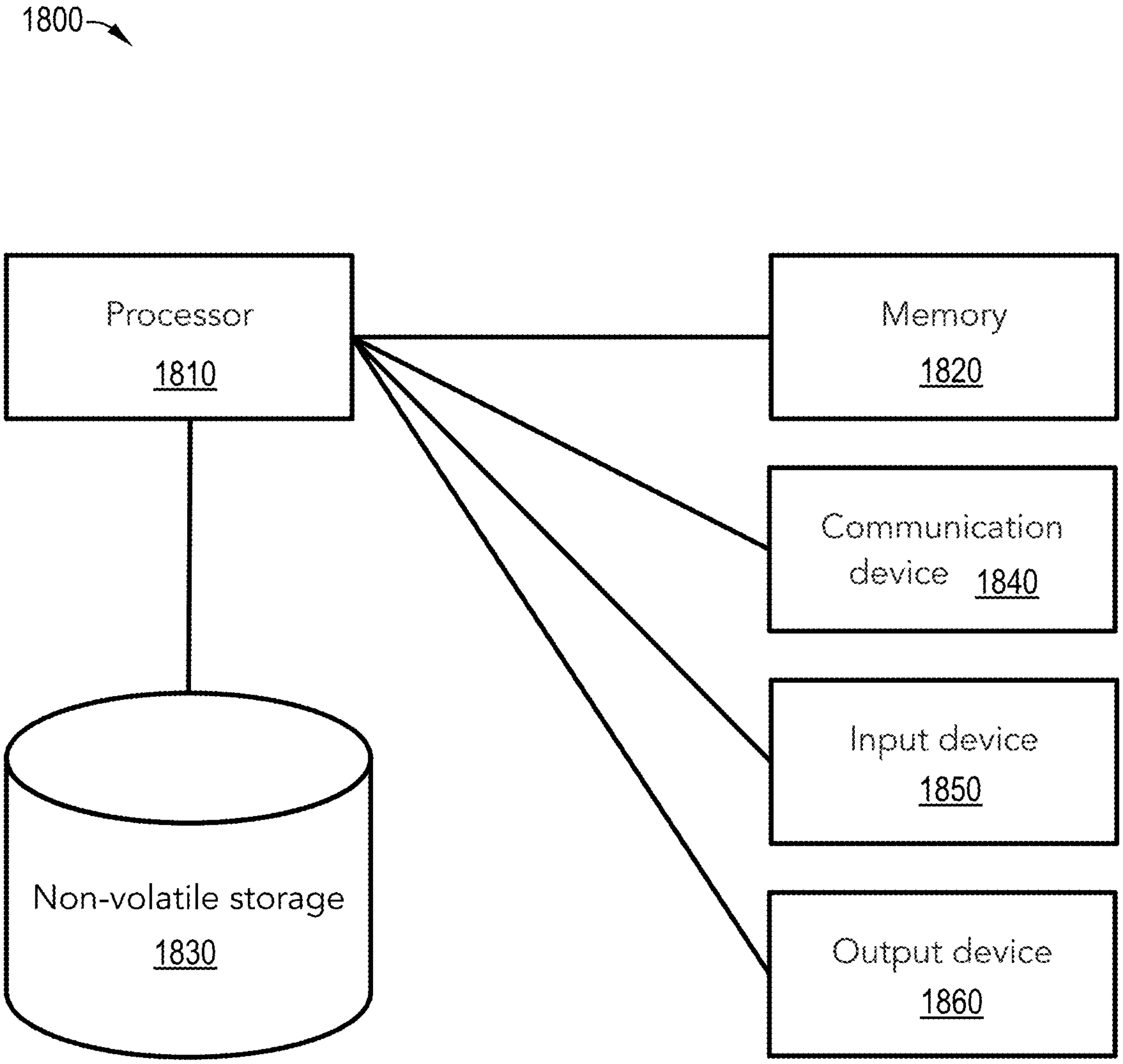
FIG. 18 is a schematic block diagram of a computer architecture, in accordance with some embodiments.

FIG. 18 is a block diagram of a computer architecture 1800 according to some embodiments. In some embodiments, one or more of the systems (or portion(s) thereof), apparatus (or portion(s) thereof) and/or devices (or portion(s) thereof) disclosed herein may have an architecture that is the same as and/or similar to one or more portions of the architecture 1800.

In some embodiments, one or more of the methods (or portion(s) thereof) disclosed herein may be performed by a system, apparatus and/or device having an architecture that is the same as or similar to the architecture 1800 (or portion(s) thereof). The architecture may be implemented as a distributed architecture or a non-distributed architecture.

Referring to FIG. 18, in accordance with at least some embodiments, the architecture 1800 may include one or more processors 1810 and one or more articles of manufacture that comprise non-transitory computer-readable storage media (e.g., memory 1820 and one or more non-volatile storage media 1830). The processor 1810 may control writing data to and reading data from the memory 1820 and the non-volatile storage device 1830 in any suitable manner, as the aspects of the disclosure provided herein are not limited in this respect. The storage media may store one or more programs and/or other information for operation of the architecture 1800. In at least some embodiments, the one or more programs include one or more instructions to be executed by the processor 1810 to provide one or more portions of one or more tasks and/or one or more portions of one or more methods disclosed herein. In some embodiments, other information includes data for one or more portions of one or more tasks and/or one or more portions of one or more methods disclosed herein. To perform any of the functionality described herein, the processor 1810 may execute one or more processor-executable instructions stored in one or more non-transitory computer-readable storage media (e.g., the memory 1820), which may serve as non-transitory computer-readable storage media storing processor-executable instructions for execution by the processor 1810.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in field programmable gate arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

Additionally, it should be appreciated that according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a smart phone, a tablet, or any other suitable portable or fixed electronic device.

As can be appreciated, the above embodiments are exemplary and illustrative, and are not intended to be limiting or exhaustive. Those skilled in the art will understand that many modifications and equivalents of the illustrative embodiments are equally possible.

The methods and systems provided are thus practical and effective in streaming real-time or near-real-time deep sky images at a useful frame rate (e.g., 30 frames per second or more) and in acceptable full color resolution. These images, whether still frames or video, may be used in a wide variety of applications such as space domain awareness, science, art, entertainment, defense, or commercial applications.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Also, a computer may have one or more communication devices 1840, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices 1850 and/or one or more output devices 1860. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

It should be understood that the features disclosed herein can be used in any combination or configuration. Thus, for example, in some embodiments, any one or more of the features disclosed herein may be used without any one or more other feature disclosed herein.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. A telescope apparatus comprising:

a telescope array comprising a plurality of telescopes each having a telescope aperture configured to receive light from a respective field of view;

a plurality of light sensors each associated with a respective one of the plurality of telescopes to receive and sample light therefrom and to output data based at least in part thereon;

a reconfigurable telescope array positioning assembly comprising a base, a first support pivotably coupled to the base, a second support pivotably coupled to the first support, and a plurality of individually-adjustable telescope supports coupled to the second support, each of the plurality of individually-adjustable telescope supports adjustably supporting a respective one of the plurality of telescopes in a respective positioning and being adjustable to change the respective positioning of the respective telescope; and an array processor to receive the data output by the plurality of light sensors and to generate an image and/or data based at least in part thereon, wherein:

each individually-adjustable telescope support comprises a frame and an adjustable clamp, each adjustable clamp includes:

a first set of abutments that can adjust the respective positioning of the respective telescope with respect to a first axis and a second set of abutments that can adjust the respective positioning of the respective telescope with respect to a second axis that is orthogonal to the first axis; and a plurality of actuators, each actuator in mechanical communication with a respective abutment in the first set of abutments and in the second set of abutments, the actuators in electrical communication with a controller, the controller generating actuator control signals to activate at least one of the actuators to adjust the respective positioning of the respective telescope, and the apparatus further comprises position sensors that are electrically coupled to the actuators and to the controller, the position sensors outputting position signals to the controller, the position signals of each position sensor representing a position of a respective actuator.

2. The apparatus of claim 1, wherein the frame of each individually-adjustable telescope support defines an opening to receive the respective telescope.

3. The apparatus of claim 1, wherein each adjustable clamp includes one or more abutments that can adjust the respective positioning of the respective telescope in one or more directions having a radial.

4. The apparatus of claim 1, wherein the actuator control signals are configured to position the telescope array in a first operating mode.

5. The apparatus of claim 4, wherein in the first operating mode the telescopes are positioned so that the respective fields of view are arranged in an array and there is a partial overlap between neighboring fields of view, the array having a plurality of columns and rows.

6. The apparatus of claim 5, wherein the first operating mode has an expanded state where there is a minority of overlap between the neighboring fields of view.

7. The apparatus of claim 6, wherein the array processor is configured to process the image and/or data using a first operating mode input signal.

8. The apparatus of claim 6, wherein the actuator control signals are configured to position the telescope array in a second operating mode where the telescopes are positioned so that the respective fields of view are arranged in the array, the second operating mode having a compressed state where there is a majority of overlap between the neighboring fields of view.

9. The apparatus of claim 8, wherein the array processor is configured to process the image and/or data using a second operating mode input signal.

10. The apparatus of claim 8, wherein the actuator control signals are configured to position the telescope array in a third operating mode where the telescopes are positioned so that the respective fields of view are arranged in a single column or a single row and there is a minority of overlap between the neighboring fields of view.

11. The apparatus of claim 10, wherein the actuator control signals are configured to position the telescope array in a fourth operating mode where the telescopes are positioned so that the respective fields of view are laterally offset with respect to a central axis and there is a minority of overlap between the neighboring fields of view.

12. The apparatus of claim 4, wherein in the first operating mode the telescopes are positioned so that the respective fields of view are arranged such that there is total overlap between the neighboring fields of view.

13. The apparatus of claim 1, wherein each telescope is disposed in a housing.

14. The apparatus of claim 1, wherein the array processor is configured to scan pixels of an image captured by the light sensors to find clusters of adjacent pixels which lie in a same image row, and to merge any clusters that are adjacent to one another.

15. A telescope apparatus comprising:

a telescope array comprising a plurality of telescopes each having a telescope aperture configured to receive light from a respective field of view;

a plurality of light sensors each associated with a respective one of the plurality of telescopes to receive and sample light therefrom and to output data based at least in part thereon;

a reconfigurable telescope array positioning assembly comprising a support and a plurality of individually-adjustable telescope supports coupled thereto, each of the plurality of individually-adjustable telescope supports adjustably supporting a respective one of the plurality of telescopes in a respective positioning and being adjustable to change the respective positioning of the respective telescope; and an array processor to receive the data output by the plurality of light sensors and to generate an image and/or data based at least in part thereon, wherein:

each individually-adjustable telescope support comprises a frame and an adjustable clamp, the frame of each individually-adjustable telescope support defines an opening to receive the respective telescope, each adjustable clamp includes:

one or more abutments that can adjust the respective positioning of the respective telescope in one or more directions having a radial component, and one or more actuators, each actuator in mechanical communication with a respective abutment of the one or more abutments, the actuators are in electrical communication with a controller, the controller generating actuator control signals to activate at least one of the actuators to adjust the respective positioning of the respective telescope, such that the telescope array can be dynamically positioned in a plurality of operating modes, and the apparatus further comprises position sensors that are electrically coupled to the actuators and to the controller, the position sensors outputting position signals to the controller, the position signals of each position sensor representing a position of a respective actuator.

16. The apparatus of claim 15, wherein the radial component includes a radial inward component and/or a radial outward component.

17. A telescope apparatus comprising:

a telescope array comprising a plurality of telescopes each having a telescope aperture configured to receive light from a respective field of view;

a plurality of light sensors each associated with a respective one of the plurality of telescopes to receive and sample light therefrom and to output data based at least in part thereon;

a reconfigurable telescope array positioning assembly comprising a support and a plurality of individually-adjustable telescope supports coupled thereto, each of the plurality of individually-adjustable telescope supports adjustably supporting a respective one of the plurality of telescopes in a respective positioning and being adjustable to change the respective positioning of the respective telescope; and an array processor to receive the data output by the plurality of light sensors and to generate an image and/or data based at least in part thereon, wherein:

each individually-adjustable telescope support comprises a frame and an adjustable clamp, the frame of each individually-adjustable telescope support defines an opening to receive the respective telescope, each adjustable clamp includes:

a first set of abutments that can adjust the respective positioning of the respective telescope with respect to a first axis, a second set of abutments that can adjust the respective positioning of the respective telescope with respect to a second axis that is orthogonal to the first axis, and a plurality of actuators, each actuator in mechanical communication with a respective abutment in the first set of abutments and in the second set of abutments, the actuators are in electrical communication with a controller, the controller generating actuator control signals to activate at least one of the actuators to adjust the respective positioning of the respective telescope, such that the telescope array can be dynamically positioned in a plurality of operating modes, and the apparatus further comprises position sensors that are electrically coupled to the actuators and to the controller, the position sensors outputting position signals to the controller, the position signals of each position sensor representing a position of a respective actuator.

18. A telescope apparatus comprising:

a telescope array comprising a plurality of telescopes each having a telescope aperture configured to receive light from a respective field of view;

a plurality of light sensors each associated with a respective one of the plurality of telescopes to receive and sample light therefrom and to output data based at least in part thereon;

a reconfigurable telescope array positioning assembly comprising a base, a first support pivotably coupled to the base, a second support pivotably coupled to the first support, and a plurality of individually-adjustable telescope supports coupled to the second support, each of the plurality of individually-adjustable telescope supports adjustably supporting a respective one of the plurality of telescopes in a respective positioning and being adjustable to change the respective positioning of the respective telescope; and an array processor to receive the data output by the plurality of light sensors and to generate an image and/or data based at least in part thereon, wherein:

each individually-adjustable telescope support comprises a frame and an adjustable clamp, each adjustable clamp includes:

a first set of abutments that can adjust the respective positioning of the respective telescope with respect to a first axis and a second set of abutments that can adjust the respective positioning of the respective telescope with respect to a second axis that is orthogonal to the first axis;

a plurality of actuators, each actuator in mechanical communication with a respective abutment in the first set of abutments and in the second set of abutments, the actuators in electrical communication with a controller, the controller generating actuator control signals to activate at least one of the actuators to adjust the respective positioning of the respective telescope, the actuator control signals are configured to position the telescope array in a first operating mode, and in the first operating mode the telescopes are positioned so that the respective fields of view are arranged in an array and there is a partial overlap between neighboring fields of view, the array having a plurality of columns and rows.

19. The apparatus of claim 18, wherein the first operating mode has an expanded state where there is a minority of overlap between the neighboring fields of view.

20. The apparatus of claim 19, wherein the array processor is configured to process the image and/or data using a first operating mode input signal.

21. The apparatus of claim 19, wherein the actuator control signals are configured to position the telescope array in a second operating mode where the telescopes are positioned so that the respective fields of view are arranged in the array, the second operating mode having a compressed state where there is a majority of overlap between the neighboring fields of view.

22. The apparatus of claim 21, wherein the array processor is configured to process the image and/or data using a second operating mode input signal.

23. The apparatus of claim 21, wherein the actuator control signals are configured to position the telescope array in a third operating mode where the telescopes are positioned so that the respective fields of view are arranged in a single column or a single row and there is a minority of overlap between the neighboring fields of view.

24. The apparatus of claim 23, wherein the actuator control signals are configured to position the telescope array in a fourth operating mode where the telescopes are positioned so that the respective fields of view are laterally offset with respect to a central axis and there is a minority of overlap between the neighboring fields of view.

25. The apparatus of claim 18, wherein in the first operating mode the telescopes are positioned so that the respective fields of view are arranged such that there is total overlap between the neighboring fields of view.

26. The apparatus of claim 18, wherein each telescope is disposed in a housing.

27. The apparatus of claim 18, wherein the array processor is configured to scan pixels of an image captured by the light sensors to find clusters of adjacent pixels which lie in a same image row, and to merge any clusters that are adjacent to one another.

* * * * *